(12) United States Patent
Yamaguchi et al.

(10) Patent No.: US 7,122,253 B2
(45) Date of Patent: Oct. 17, 2006

(54) CURABLE RESIN COMPOSITION, CURED FILM, AND COMPOSITE PRODUCT

(75) Inventors: Yoshikazu Yamaguchi, Ibaraki (JP); Isao Nishiwaki, Ibaraki (JP); Yuichi Eriyama, Ibaraki (JP); Takashi Ukachi, Ibaraki (JP); Takao Yashiro, Kawagushi (JP); Michiko Takahashi, Tokyo (JP)

(73) Assignee: DSM N.V., Te Heerlen (NL)

( * ) Notice: Subject to any disclaimer, the term of this patent is extended or adjusted under 35 U.S.C. 154(b) by 40 days.

(21) Appl. No.: 10/257,762

(22) PCT Filed: Apr. 17, 2001

(86) PCT No.: PCT/NL01/00304

§ 371 (c)(1),
(2), (4) Date: Dec. 3, 2003

(87) PCT Pub. No.: WO01/81466

PCT Pub. Date: Nov. 1, 2001

(65) Prior Publication Data

US 2004/0096663 A1  May 20, 2004

(30) Foreign Application Priority Data

| Apr. 20, 2000 | (JP) | ............................. 2000-120099 |
| Apr. 20, 2000 | (JP) | ............................. 2000-120102 |
| Apr. 28, 2000 | (JP) | ............................. 2000-129060 |
| Jun. 8, 2000 | (JP) | ............................. 2000-171831 |
| Oct. 11, 2000 | (JP) | ............................. 2000-310522 |

(51) Int. Cl.
*C08F 30/08* (2006.01)

(52) U.S. Cl. ........................ 428/447; 428/405; 428/428; 526/318; 526/319; 526/321; 526/323.1; 526/328; 526/346; 526/279; 528/28; 528/29

(58) Field of Classification Search ................ 526/279; 522/99; 428/447, 500, 521
See application file for complete search history.

(56) References Cited

U.S. PATENT DOCUMENTS 5,006,573 A * 4/1991 Plueddemann ............... 523/214
5,585,201 A   12/1996 Ha
5,723,175 A    3/1998 Scholz et al.

FOREIGN PATENT DOCUMENTS

| EP | 867469 | 9/1998 |
| WO | 97/12942 | 4/1997 |
| WO | 99/20671 | 4/1999 |
| WO | 99/35195 | 7/1999 |
| WO | 01/12690 | 2/2001 |
| WO | 01/12737 | 2/2001 |

* cited by examiner

*Primary Examiner*—Marc S. Zimmer
(74) *Attorney, Agent, or Firm*—Mayer, Brown, Rowe & Maw, LLP

(57) ABSTRACT

A curable resin composition comprising (A) reactive particles prepared by bonding (A1) at least one of oxide particles of an element selected from the group consisting of silicon, aluminum, zirconium, titanium, zinc, germanium, indium, tin, antimony, ruthenium, rhenium, silver, nickel, cupper and cerium, and (A2) an organic compound which comprises a polymerizable unsaturated group, (B) a compound having two or more polymerizable unsaturated groups in the molecule, and optionally (C) a terminal reactive polysiloxane compound having at least one polymerizable group, other than organic compound (A2).

22 Claims, 1 Drawing Sheet

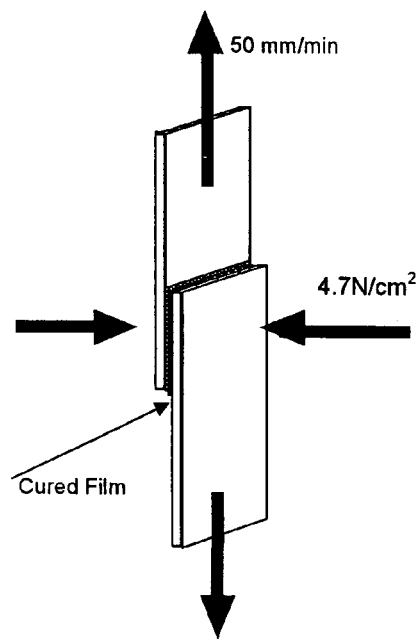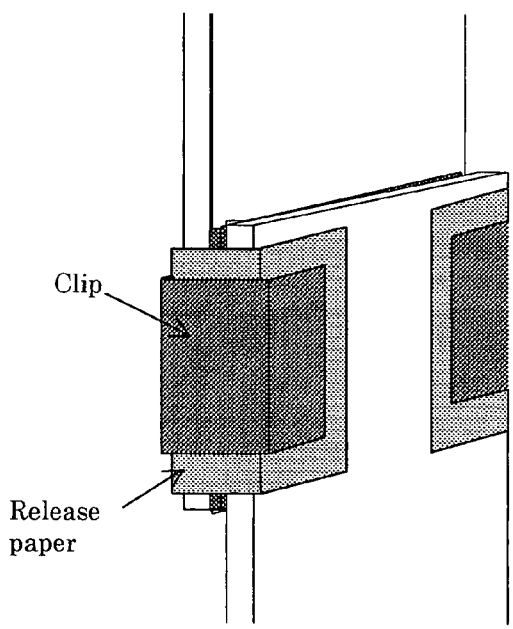
Figure 1 Lubricity test.

CURABLE RESIN COMPOSITION, CURED FILM, AND COMPOSITE PRODUCT

CROSS REFERENCE TO RELATED APPLICATIONS

This application is the National Phase of International Application PCT/NL01/00304 filed Apr. 17, 2001 which designated the U.S., and is hereby incorporated in its entirety by reference.

The present invention relates to a curable resin composition, a cured film, and a composite product. Particularly, the present invention relates to a curable resin composition capable of forming a coating (cured film) excelling in hardness, scratch resistance, adhesion, superb surface slip characteristics, low curling properties, transparency and light resistance on the surface of various substrates, such as plastics (polycarbonate, polymethylmethacrylate, polystyrene, polyester, polyolefin, epoxy resins, melamine resins, triacetylcellulose resins, ABS resins, AS resins, norbornene resins, etc.), metals, wood, paper, glass, ceramics, and slates, to a cured film, and to a composite product. The curable resin composition is suitably used as a hard coating material for preventing stains or cracks (scratches), or as a reflection preventing coating material on the surface of various substrates like plastic optical parts such as a plastic lens, touch panels, film-type liquid crystal elements, display panels, like LCD, PDP and CRT, digital versatile discs, magneto optical discs, plastic containers, plastic windows or panes for for example cars or buildings, or flooring materials, wall materials, and artificial marbles used for an architectural interior finish; as an adhesive or a sealing material for various substrates; or for example as a vehicle for printing ink.

Conventionally, films having hardness, scratch resistance, and adhesion (hard coat) are formed on the surface of for example information communication devices using a radiation-curable composition to ensure performance and safety of the devices.

Recent remarkable progress in development and generalization of information communication devices requires further improvement of quality, performance, and productivity of the hard coat.

Conventional radiation-curable materials have hardness, scratch resistance, and adhesion to a certain extent. However, these conventional radiation-curable materials cannot fully satisfy the demands for high hardness, low surface slip, low curling, transparency and good light resistance, which is required for the hard coat.

Japanese Patent Application Laid-open No 124514/1999 discloses a thermo-card coat composition comprising an acrylic ester of bisphenol A diglycidyl ether polymer, dipentaerythritol monohydroxy pentaacrylate, a photopolymerization initiator, inorganic particles and a terminal reactive-polydimethylsiloxane to be used as a photocurable coating composition. The transparency, hardness and scratch resistance of the compositions after cure are not satisfactory.

The present invention has been achieved to solve the above problems. An object of the present invention is to provide a curable composition exhibiting excellent applicability and being capable of forming coatings with high hardness, transparency, superior scratch resistance and superb surface slip characteristsics on the surface of the various substrates.

A further object of the present invention is to provide a curable resin composition capable of forming a coating (cured film) excelling in light resistance, on the surface of the various substrates.

A further object of the present invention is to provide coatings that improve the performance of hardcoatings in antistatic film and antireflection film applications in for example information communication devices and display panels. In particular, prevention of adherence of dust due to static electricity and decrease in transmittance due to reflection is required for optical articles in such applications.

Yet another object of the present invention is to provide compositions than can be used for preparing hardcoatings with a high productivity and which hardcoatings show very good stain resistance.

As a result of extensive studies, the present inventors have found that the above object can be achieved by using a composition comprising (A) reactive particles prepared by bonding (A1) at least one of oxide particles of an element selected from the group consisting of silicon, aluminum, zirconium, titanium, zinc, germanium, indium, tin, antimony, ruthenium, rhenium, silver, nickel, cupper and cerium, and (A2) an organic compound which comprises a polymerizable unsaturated group, (B) a compound having two or more polymerizable unsaturated groups in the molecule, (C) a terminal reactive polysiloxane compound having at least one polymerizable group, other than organic compound (A2).

Specifically, the present invention provides the following curable resin composition, cured film, and composite product.

Preferred embodiments of the present invention will be described in more detail.

BRIEF DESCRIPTION OF DRAWINGS

FIG. 1: An apparatus for measuring surface slip characteristics.

I. CURABLE RESIN COMPOSITION

The curable resin composition according to the present invention comprises (A) reactive particles prepared by bonding (A1) at least one of oxide particles of an element selected from the group consisting of silicon, aluminum, zirconium, titanium, zinc, germanium, indium, tin, antimony, ruthenium, rhenium, silver, nickel, cupper and cerium, and (A2) an organic compound which comprises a polymerizable unsaturated group (hereinafter may be called "reactive particles (A)"), (B) a compound having two or more polymerizable unsaturated groups in the molecule (hereinafter may be called "compound (B)"), (C) a terminal reactive polysiloxane compound having at least one polymerizable group.

Each component will be described in more detail.

1. Reactive Particles (A)

The reactive particles (A) used in the present invention are prepared by bonding (A1) at least one of oxide particles of an element selected from the group consisting of silicon, aluminum, zirconium, titanium, zinc, ruthenium, rhenium, silver, nickel, cupper, germanium, indium, tin, antimony, and cerium, and (A2) an organic compound which comprises a polymerizable unsaturated group.

In the present invention, a reaction product (having a certain solid content) which is obtained in a reaction solution (which is a dispersion liquid) during the preparation of the reactive particles (A) by reacting the oxide particles (A1) and the organic compound (A2) (hereinafter may be called "reaction product (X)"), comprises the reactive particles (A), unreacted residual organic compound (A2) and reaction products of the organic compounds (A2) produced during the reaction.

The "solid content" of the reaction product refers to the content of the components excluding volatile components such as solvents. Specifically, the "solid content" refers to the content of a residue (nonvolatile components) obtained by drying the composition on a hot plate at 120° C. for one hour.

(1) Oxide Particles (A1)

In order to obtain a colorless cured film from the curable composition, the oxide particles (A1) used in the present invention should be oxide particles of at least one element selected from the group consisting of silicon, aluminum, zirconium, titanium, zinc, germanium, indium, tin, antimony, and cerium.

Examples of the oxide particles (A1) are particles of silica, alumina, zirconia, titanium oxide, zinc oxide, germanium oxide, indium oxide, tin oxide, indium-tin oxide (ITO), antimony oxide, and cerium oxide. Of these, particles of silica, alumina, zirconia, and antimony oxide are preferable because of high hardness. These oxide particles (A1) may be used either individually or in combination of two or more. The oxide particles (A1) are preferably in the form of a powder or a solvent dispersion sol. If the oxide particles (A1) are in the form of a solvent dispersion sol, an organic solvent is preferable as a dispersion medium in view of mutual solubility with other components and dispersibility. Examples of organic solvents are alcohols such as methanol, ethanol, isopropanol, butanol, and octanol; ketones such as acetone, methyl ethyl ketone, methyl isobutyl ketone, and cyclohexanone; esters such as ethyl acetate, butyl acetate, ethyl lactate, γ-butyrolacton propylene glycol monomethyl ether acetate, and propylene glycol monoethyl ether acetate; ethers such as ethylene glycol monomethyl ether and diethylene glycol monobutyl ether; aromatic hydrocarbons such as benzene, toluene, and xylene; amides such as dimethylformamide, dimethylacetamide, and N-methylpyrrolidone. Of these, methanol, isopropanol, butanol, methyl ethyl ketone, methyl isobutyl ketone, ethyl acetate, butyl acetate, toluene, and xylene are preferable.

The number average particle diameter of the oxide particles (A1) is preferably 0.001–2 μm, still more preferably 0.001–0.2 μm, and particularly preferably 0.001–0.1 μm. If the number average particle diameter is more than 2 μm, transparency of the resulting cured product may decrease or the surface conditions of the resulting film may be impaired. Surfactants or amines may be added to the solvent to improve dispersibility of the particles.

Examples of commercially available products of silicon oxide particles (silica particles, for example) are colloidal silica, Methanol Silica Sol, IPA-ST, MEK-ST, NBA-ST, XBA-ST, DMAC-ST, ST-UP, ST-OUP, ST-20, ST-40, ST-C, ST-N, ST-O, ST-50, ST-OL (manufactured by Nissan Chemical Industries, Ltd.). Examples of powdered silica are AEROSIL 130, AEROSIL 300, AEROSIL 380, AEROSIL TT600, and AEROSIL OX50 (manufactured by Japan Aerosil Co., Ltd.), Sildex H31, H32, H51, H52, H121, H122 (manufactured by Asahi Glass Co., Ltd.), E220A, E220 (manufactured by Nippon Silica Industrial Co., Ltd.), SYLYSIA 470 (manufactured by Fuji Silycia Chemical Co., Ltd.) and SG Flake (manufactured by Nippon Sheet Glass Co., Ltd.).

The following products are given as examples of other commercially available products of the oxide particles (A1): as an aqueous dispersion product of alumina, Alumina Sol-100, -200, -520 (manufactured by Nissan Chemical Industries, Ltd.); as an isopropanol dispersion product of alumina, AS-150I (manufactured by Sumitomo Osaka Cement Co., Ltd.); as a toluene dispersion product of alumina, AS-150T (manufactured by Sumitomo Osaka Cement Co., Ltd.); as a toluene dispersion product of zirconia, HXU-110JC (manufactured by Sumitomo Osaka Cement Co., Ltd.); as an aqueous dispersion product of zinc antimonate powder, Celnax (manufactured by Nissan Chemical Industries, Ltd.); as powder or a solvent dispersion product of alumina, titanium oxide, tin oxide, indium oxide, zinc oxide, etc., NanoTek (manufactured by C.I. Kasei Co., Ltd.); as an aqueous dispersion sol of antimony doped-tin oxide, SN-100D (manufactured by Ishihara Sangyo K. K.); as ITO powder, a product manufactured by Mitsubishi Materials Corporation; and as an aqueous dispersion product of cerium oxide, Needral (manufactured by Taki Chemical Co., Ltd.).

The shape of the oxide particles (A1) may be globular, hollow, porous, rod-like, plate-like, fibrous, or amorphous, with a globular shape being preferable. The specific surface area of the oxide particles (A1) determined by the BET method using nitrogen is preferably 10–1000 $m^2/g$, and still more preferably 100–500 $m^2/g$. The oxide particles (A1) can be used either in the form of a dry powder or a dispersion in water or an organic solvent. For example, a dispersion liquid of fine oxide particles known as a solvent dispersion sol of these oxides may be used. Use of a solvent dispersion sol of oxides is particularly preferable in the applications in which a cured product having excellent transparency is needed.

A specific embodiment of the present invention is the use of metal oxides that are conductive particles for obtaining excellent antistatic performance of cured films. These conductive particles preferably have a volume resistivity of 300 Ω·cm or less, and preferably 100 Ω·cm or less. If the volume resistivity exceeds 300 Ω·cm, antistatic performance of the resulting cured film decreases.

The primary particle diameter of the conductive particles determined by measuring the dried powder using the BET adsorption method is 0.1 μm or less, and preferably 0.01–0.001 μm. If the primary particle diameter exceeds 0.1 μm, precipitation may occur in the composition, or a film with a flat, smooth surface may not be obtained.

The proportion of the conductive particles is preferably 50–95 wt %, and still more preferably 65–95 wt % of the total solid content in the composition. If the proportion is less than 50 wt %, antistatic performance of the resulting cured film may be insufficient.

The metal oxide of the conductive particles may be an oxide of a single metal or an oxide of an alloy of two or more metals. As a semiconductor, an oxide of a single metal having a composition in which the oxygen content slightly deviates from the stoichiometry, a solid solution or mixed crystal of oxides of two or more elements with a doping agent which forms an impurity level, or the like may be used.

The conductive particles may be powdered or dispersed in an organic solvent. It is preferable to prepare the composition using the conductive particles dispersed in an organic solvent, because uniform dispersibility can be easily obtained.

As specific examples of metal oxides used as the conductive particles, at least one type of particles selected from the group consisting of tin-doped indium oxide (ITO), antimony-doped tin oxide (ATO), fluorine-doped tin oxide (FTO), phosphorus-doped tin oxide (PTO), zinc antimonate, indium-doped zinc oxide, ruthenium oxide, rhenium oxide, silver oxide, nickel oxide, and copper oxide can be given.

Examples of commercially available products of the powdered conductive particles are T-1 (ITO) (manufactured by Mitsubishi Materials Corporation), PASSTRAN (ITO) (manufactured by Mitsui Mining & Smelting Co., Ltd.), SN-100P (ATO) (manufactured by Ishihara Sangyo Kaisha, Ltd.), NanoTek ITO (manufactured by C.I. Kasei Co., Ltd.), and ATO☐FTO (manufactured by Nissan Chemical Industries, Ltd.).

It is preferable that the conductive particles comprise silicon oxide on the surface thereof for ensuring an effective reaction with the organic compound (A2). As a method of allowing silicon oxide to be deposited on the surface of the conductive particles, for example, Japanese Patent No. 2858271 discloses a method which comprises producing a coprecipitation product of tin oxide and a hydrate of antimony oxide, allowing silicon oxide to be deposited on the coprecipitation product, and classifying and sintering the product.

Examples of commercially available products of the conductive particles comprising silicon oxide on the surface thereof are SN-100P (ATO), SNS-10M and FSS-10M (manufactured by Ishihara Sangyo Kaisha, Ltd.).

Examples of commercially available products of the conductive particles dispersed in an organic solvent are SNS-10M (antimony-doped tin oxide dispersed in MEK), FSS-10M (antimony-doped tin oxide dispersed in isopropyl alcohol) (manufactured by Ishihara Sangyo Kaisha, Ltd.), Celnax CX-Z401 M (zinc antimonate dispersed in methanol) and Celnax CX-Z200IP (zinc antimonate dispersed in isopropyl alcohol) (manufactured by Nissan Chemical Industries, Ltd.).

A method of dispersing the powdered conductive particles (a-1) in an organic solvent is for example a method which comprises adding a dispersing agent and an organic solvent to the conductive particles (a-1), adding beads of zirconia, glass, and alumina to the mixture as dispersion media, and dispersing the conductive particles by stirring the mixture at a high speed using a paint shaker, Henshel mixer. The proportion of the dispersing agent to be added is preferably 0.1–5 wt % of the total weight of the composition. As examples of the dispersing agent, anionic, nonionic, or cationic surfactants such as polyacrylic acid alkaline metal salt, phosphate of polyether, polyethylene oxide/polypropylene oxide block-copolymer, nonyl phenyl polyether, and cetyl ammonium chloride can be given.

The proportion of the non-conductive particles to be used in order to obtain excellent antistatic film properties is preferably 0–60 wt %, and still more preferably 10–40 wt % of the total solid content in the composition.

It is possible to combine conductive particles with non-conductive particles. Combined use of the conductive particles and non-conductive particles increases the refractive index and improves transparency while maintaining the surface resistivity of the resulting cured product in the range which ensures antistatic performance, specifically $10^{12}$ Ω or less.

As the non-conductive particles, inorganic oxide particles having a refractive index of 1.65 or more other than the conductive particles are preferably used. As specific examples of the non-conductive particles, at least one type of particles selected from the group consisting of tin oxide, zirconium oxide, titanium oxide, cerium oxide, antimony oxide, and indium oxide can be given.

The non-conductive particles are preferably mixed with the composition of the present invention after hydrolyzing the non-conductive particles and the organic compound (A2) in the organic solvent. This hydrolysis step improves dispersion stability of the non-conductive particles. If the non-conductive particles are mixed without carrying out this step, transparency of the composition may decrease. The hydrolysis of the non-conductive particles and the organic compound (A2) in the organic solvent can be carried out in the same manner as in the case of the conductive particles.

As commercially available products of the non-conductive particles, NanoTek (tin oxide, zirconia oxide, titanium oxide, cerium oxide: manufactured by C.I. Kasei Co., Ltd.), Needral (cerium oxide sol: manufactured by Taki Chemical Co., Ltd.), Titania Sol (manufactured by Ishihara Sangyo Kaisha, Ltd.), Sun Colloid (antimony pentoxide dispersion sol dispersed in methanol, isopropyl alcohol, dimethylformamide, toluene, methyl ethyl ketone, and ethoxyethanol: manufactured by Nissan Chemical Industries, Ltd.), zirconia sol dispersed in toluene and methyl ethyl ketone (manufactured by Sumitomo Osaka Cement Co., Ltd.), and the like can be given.

(2) Organic Compound (A2)

The organic compound (A2) used in the present invention comprises a polymerizable unsaturated group in the molecule, and preferably further comprises the group [—X—C(=Y)—NH—] shown by the formula (1), wherein X represents NH, O (oxygen atom), or S (sulfur atom), and Y represents O or S. The organic compound (A2) preferably comprises the group represented by [—O—C(=O)—NH—] and at least one of the groups represented by [—O—C(=S)—NH—] and [—S—C(=O)—NH—]. It is preferable that the organic compound (A2) contains a silanol group in the molecule or a group that forms a silanol group by hydrolysis.

(1)

1) Polymerizable Unsaturated Group

There are no specific limitations to the polymerizable unsaturated group included in the organic compound (A2). An acryloyl group, methacryloyl group, vinyl group, propenyl group, butadienyl group, styryl group, ethynyl group, cinnamoyl group, malate group, and acrylamide group can be given as preferable examples.

The polymerizable unsaturated group is a structural unit to effect an addition polymerization by active radicals.

2) Group Shown by Formula (1)

There are six types for the group [—X—C(=Y)—NH—] of the formula (1) included in the organic compound (A2), specifically, they are [—O—C(=O)—NH—], [—O—C(=S)—NH—], [—S—C(=O)—NH—], [—NH—C(=O)—NH—], [—NH—C(=S)—NH—], and [—S—C(=S)—NH—]. These groups may be used either individually or in combination of two or more. It is preferable to use the group represented by [—O—C(=O)—NH—] and at least one of the groups represented by [—O—C(=S)—NH—] and [—S—C(=O)—NH—] in combination to provide good heat stability.

The group [—X—C(=Y)—NH—] shown by the formula (1) is considered to generate a moderate cohesive force by a hydrogen bond in the molecule and provide the resulting cured product with characteristics such as superior mechanical strength, excellent adhesion to substrates, and good heat resistance.

3) Silanol Group or Group Which Forms Silanol Group by Hydrolysis

The organic compound (A2) is preferably a compound having a silanol group (hereinafter may be called "silanol group-containing compound") or a compound which forms a silanol group by hydrolysis (hereinafter may be called "silanol group-forming compound"). Examples of silanol group-forming compounds are compounds in which an alkoxy group, aryloxy group, acetoxy group, amino group, a halogen atom, or the like is bonded to a silicon atom. Preferably a compound is used in which an alkoxy group or aryloxy group is bonded to a silicon atom, that is, a compound containing an alkoxysilyl group or an aryloxysilyl group.

The silanol group or the silanol group-forming site of the silanol group-forming compound is a structural unit which bonds to the oxide particles (A1) by a condensation reaction or condensation following hydrolysis.

4) Preferable Embodiment

The compound shown by the following formula (2) can be given as a preferable specific example of the organic compound (A2):

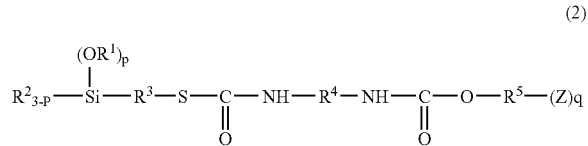

(2)

wherein $R^1$ and $R^2$ individually represent a hydrogen atom, an alkyl group having 1–8 carbon atoms, for example a methyl, ethyl, propyl, butyl, cyclohexyl, octylgroup, or aryl group, for example a phenyl group, xylyl group, $R^3$ is a divalent organic group having between 1 and 12 carbon atoms and has an aliphatic structure, which may include a linear, branched, or cyclic, or an aromatic structure; $R^4$ is a divalent organic group selected from divalent organic groups having a molecular weight of 14–10,000, and preferably 76–500; $R^5$ is an organic group with a valence of (q+1), which is preferably selected from the group consisting of linear, branched, or cyclic saturated and unsaturated hydrocarbon groups; $R^1$, $R^2$, $R^3$, $R^4$ and $R^5$ may contain heteroatoms like for example O, N, S, and P; Z is a monovalent organic group having a polymerizable unsaturated group in the molecule which causes an inter-molecular cross-linking reaction in the presence of active radicals; p is an integer from 1 to 3; q is an integer preferably from 1 to 20, still more preferably from 1 to 10, and particularly preferably from 1 to 5.

Examples of the group represented by $[(R^1O)_p R^2_{3-p}Si—]$ are a trimethoxysilyl group, triethoxysilyl group, triphenoxysilyl group, methyldimethoxysilyl group and a dimethylmethoxysilyl group. Of these, a trimethoxysilyl group and a triethoxysilyl group are preferable.

Specific examples of the group $R^3$ are aliphatic groups having 1–12 C-atoms, such as a methylene, ethylene, propylene, methyl ethylene, butylene, methyl propylene, octamethylene, and dodecamethylene, alicyclic groups having 3–12 carbon atoms such as cyclohexylene, and aromatic groups having 6–12 carbon atoms such as phenylene, 2-methylphenylene, 3-methylphenylene and biphenylene. Preferably the group $R^3$ is a methylene, propylene, cyclohexylene or phenylene group.

The group $R^4$ is a divalent organic group having a molecular weight from 14 to 10,000, and preferably from 76 to 500. Examples of such an organic group include divalent organic groups having an aliphatic or aromatic structure which may include a linear, branched, or cyclic structure. As examples of such a structure, divalent organic groups having a linear structure such as a methylene, ethylene, propylene, tetramethylene, hexamethylene, 2,2,4-trimethylhexamethylene, and 1-(methylcarboxyl)-pentamethylene; divalent organic groups having an alicyclic structure such as an isophorone, cyclohexylmethane, methylenebis(4-cyclohexane), hydrogenated dienylmethane, hydrogenated xylene, hydrogenated toluene; and divalent organic groups having an aromatic structure such as benzene, toluene, xylene, p-phenylene, diphenylmethane, diphenylpropane, and naphthalene can be given.

Examples of $R^5$ are linear or branched, saturated or unsaturated hydrocarbon groups with a valence of (q+1). Specific examples include, in addition to the divalent organic groups given for the group $R^4$, a trivalent organic group such as a 2-ethyl-2-methylenepropylene, a trivalent organic group having an isocyanate structure, a tetravalent organic group such as a substituted alkylene group (2,2-dimethylenepropylene, for example), and a hexavalent organic group such as an alkylene group derived from dipentaerythritol. Of these groups, ethylene, 2-ethyl-2-methylenepropylene, a trivalent organic group having an isocyanuric skeleton, a substituted alkylene group such as 2,2-dimethylenepropylene, and an alkylene group derived from dipentaerythritol are preferable.

Examples of the group represented by Z are an acryloxy group, methacryloxy group, vinyl group, propenyl group, butadienyl group, styryl group, ethynyl group, cinnamoyl group, malate group, and acrylamide group can be given. Of these, an acryloxy group, methacryloxy group, and the vinyl group are preferable.

The organic compound (A2) may be synthesized using a method disclosed in Japanese Patent Application Laid-open No. 100111/1997, for example. A first method for synthesizing compound (A2) is a method comprising an addition reaction of a mercaptoalkoxysilane, a polyisocyanate compound, and an active hydrogen group-containing polymerizable unsaturated compound. A second method comprises a direct reaction of a compound having both an alkoxy silyl group and an isocyanate group in the molecule with an active hydrogen-containing polymerizable unsaturated compound. Still another method (c) comprises an addition reaction of a compound having both a polymerizable unsaturated group and an isocyanate group in the molecule with a mercapto alkoxysilane compound or aminosilane compound.

Among these methods, the method (a) is preferably used to synthesize the compound shown by the above-mentioned formula (2).

The proportion of the organic compound (A2) bonded to the oxide particles (A1) in the reactive particles (A) is preferably 0.01 wt % or more, still more preferably 0.1 wt % or more, and particularly preferably 1 wt % or more, of 100 wt % of the total solid content of the reactive particles (A) (oxide particles (A1) and organic compound (A2) bonded together). If the proportion of the organic compound (A2) bonded to the oxide particles (A1) is less than 0.01 wt %, dispersibility of the reactive particles (A) in the composition may be insufficient, whereby transparency and scratch resistance of the resulting cured product may be impaired. The proportion of the oxide particles (A1) among the raw materials in the preparation of the reactive particles (A) is preferably 5–99 wt %, and still more preferably 10–98 wt %.

The amount of the reactive particles (A) to be incorporated in the curable composition is preferably 5–90 wt %, and still more preferably 10–70 wt %, of 100 wt % of the composition (the total weight of the reactive particles (A), compound (B), and compound (C)). If the amount is less than 5 wt %, cured products with a high hardness may not be obtained. If more than 90 wt %, film formability may be inadequate.

The content of the reactive particles (A) refers to the solid content, which does not include the amount of solvents when the reactive particles (A) are used in the form of a solvent dispersion sol.

A different embodiment of the present invention is the use of special organic compounds (A3) that contain silicon and a radical poymerization initiation group in the same molecule. These compounds are useful as a surface modifier for reactive particles used in a resin composition capable of forming a coating (cured film) on the surface of various substrates. The resin composition shows excellent productivity when curing the compostion, with the cured product exhibiting superior scratch resistance, excellent transparency, low curling properties and good stain resistance.

(i) Radical Generating Group

There are no specific limitations to the radical generating group included in the organic compound (A3). For example, monovalent organic groups shown by the formulas (3) and (4) can be given as examples. These organic groups generate radicals upon irradiation, for example.

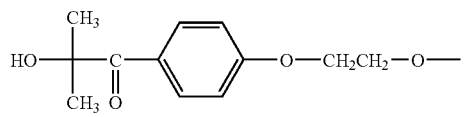 (3)

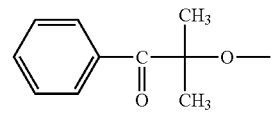 (4)

The composition comprising the reactive particles of the present invention can be cured without using a polymerization initiator with a low molecular weight by the action of the radical generating group.

(ii) Hydrolyzable Group

There are no specific limitations to the hydrolyzable group included in the organic compound (A3). For example, a silanol group and a group which forms a silanol group by hydrolysis can be given as examples.

The organic compound (A3) is preferably a compound having a silanol group in the molecule (hereinafter may be referred to as "silanol group-containing compound") or a compound which forms a silanol group by hydrolysis (hereinafter may be referred to as "silanol group-forming compound"). As the silanol group-forming compound, a compound comprising an alkoxy group, aryloxy group, acetoxy group, amino group, a halogen atom, or the like bonded to a silicon atom can be given. A compound comprising an alkoxy group or aryloxy group bonded to a silicon atom, specifically, a compound containing an alkoxysilyl group or a compound containing an aryloxysilyl group is preferable.

The silanol group or the silanol group-forming site of the silanol group-forming compound is a structural unit which bonds to the oxide particles (a) by condensation or condensation which occurs after hydrolysis.

(iii) Preferable Embodiment

The compounds shown by the following formulas (5) to (10) can be given as preferable examples of the organic compound (A3).

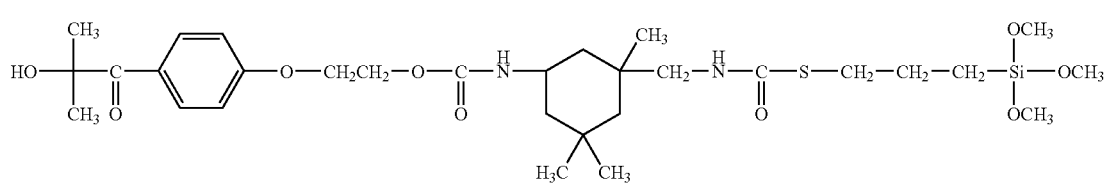 (5)

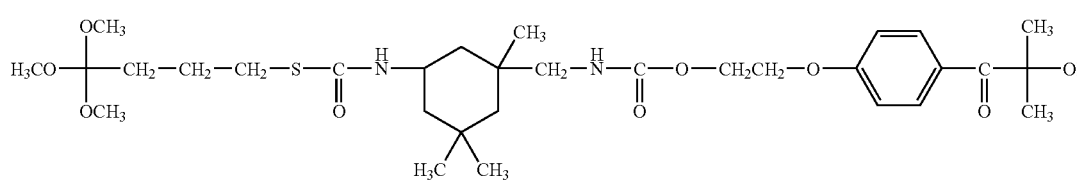 (6)

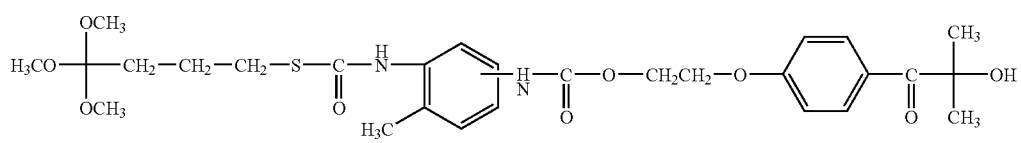 (7)

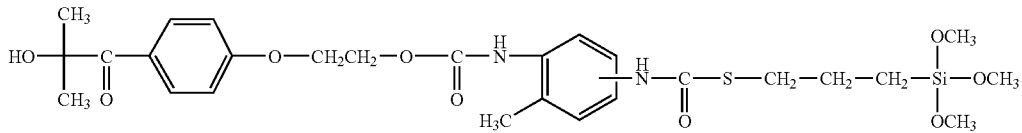
(8)

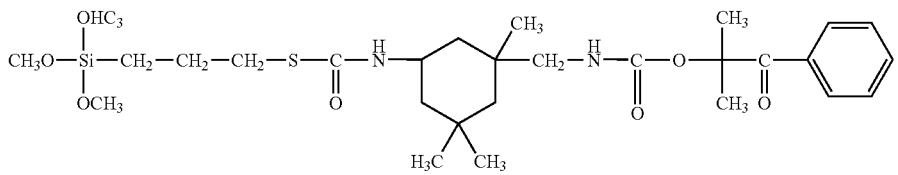
(9)

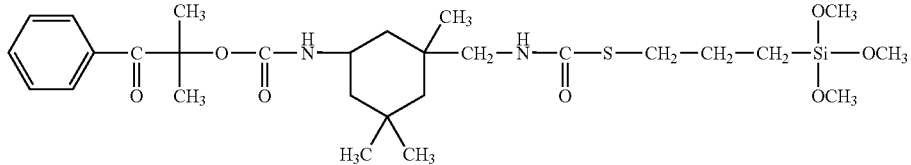
(10)

The proportion of the organic compound (A3) bonded to the oxide particles (A1) is preferably 0.01 wt % or more, more preferably 0.1 wt % or more, and particularly preferably 1 wt % or more, for 100 wt % of the reactive particles (A) (total of the oxide particles (A1), organic compounds (A3) and (B2)). If the proportion of the organic compound (A3) bonded to the oxide particles (A1) is less than 0.01 wt %, the resulting cured product may exhibit insufficient hardness and insufficient transparency. The proportion of the organic compound (A3) bonded to the oxide particles (a) can be determined as a weight loss (%) by a thermogravimetric analysis at a temperature from 110° C. to 800° C, when allowing the dry powder of the reactive particles of the present invention to burn completely in air. The proportion of the oxide particles (a) among the raw materials in the preparation of the reactive particles (A) is preferably 5–99 wt %, and still more preferably 10–98 wt %.

2. Compound (B)

The compound (B) used in the present invention comprises two or more polymerizable unsaturated groups in the molecule. The compound (B) is suitable for increasing film-formability of the composition. There are no specific limitations to the compound (B) insofar as the compound comprises two or more polymerizable unsaturated groups. It is preferable to use a compound having three or more polymerizable unsaturated groups such as (meth)acrylates and vinyl compounds. Of these, (meth)acrylates are particularly preferable.

The compound (B) excludes products produced by a reaction among of the organic compounds (A2) included in the reaction product (X).

The following compounds can be given as specific examples of the compound (B).

Examples of (meth)acrylates include trimethylolpropane tri(meth)acrylate, ditrimethylolpropane tetra(meth)acrylate, pentaerythritol tri(meth)acrylate, pentaerythritol tetra(meth) acrylate, dipentaerythritol penta(meth)acrylate, dipentaerythritol hexa(meth)acrylate, glycerol tri(meth)acrylate, tris(2-hydroxyethyl)isocyanurate tri(meth)acrylate, ethylene glycol di(meth)acrylate, 1,3-butanediol di(meth)acrylate, 1,4-butanediol di(meth)acrylate, 1,6-hexanediol di(meth) acrylate, neopentyl glycol di(meth)acrylate, diethylene glycol di(meth)acrylate, triethylene glycol di(meth)acrylate, dipropylene glycol di(meth)acrylate, tris(2-hydroxyethyl) isocyanurate di(meth)acrylate, poly(meth)acrylates of ethylene oxide or propylene oxide addition product of starting alcohols of these (meth)acrylates, oligoester (meth)acrylates, oligoether (meth)acrylates, oligourethane (meth)acrylates, and oligoepoxy (meth)acrylates having two or more (meth)acryloyl groups in the molecule, and the like. Of these, dipentaerythritol hexa(meth)acrylate, dipentaerythritol penta(meth)acrylate, pentaerythritol tri(meth)acrylate, pentaerythritol tetra(meth)acrylate, trimethylolpropane tri (meth)acrylate and ditrimethylolpropane tetra(meth)acrylate are preferable.

As examples of vinyl compounds, divinylbenzene, ethylene glycol divinyl ether, diethylene glycol divinyl ether, triethylene glycol divinyl ether, and the like can be given.

As examples of commercially available products of the compound (B), Aronix M-400, M-408, M-450, M-305, M-309, M-310, M-315, M-320, M-350, M-360, M-208, M-210, M-215, M-220, M-225, M-233, M-240, M-245, M-260, M-270, TO-924, TO-1270, TO-1231, TO-595, TO-756, TO-1231, TO-902, TO-904, TO-905, TO-1330 (manufactured by Toagosei Co., Ltd.), KAYARAD DPHA, DPCA-20, DPCA-30, DPCA-60, DPCA-120, T-1420, PET-30, GPO-303, TMPTA, THE-330, TPA-320, TPA-330, HDDA, NPGDA, TPGDA, PEG400DA, MANDA, HX-220, HX-620, R-551, R-712, R-167, R-526, R-551, R-604, SR-295, SR-355, SR-399E, SR-494, SR-9041, SR-368, SR-415, SR-444, SR-454, SR-492, SR-499, SR-502, SR-9020, SR-9035, SR-111, SR-212, SR-213, SR-230, SR-259, SR-268, SR-272, SR-344, SR-349, SR-601, SR-602, SR-610, SR-9003, KS-HDDA, KS-TPGDA, KS-TMPTA (manufactured by Nippon Kayaku Co., Ltd.), and Light Acrylate PE-4A, DPE-6A, DTMP-4A (manufactured by Kyoeisha Chemical Co., Ltd.), and the like can be given.

As required, a compound having one polymerizable unsaturated group in the molecule may be added to the composition in addition to the compound (B).

3. Compound (C)

Compound (C) is a terminal reactive polysiloxane compound having at least one polymerizable group. There are no specific limitations to the polymerizable group included in the terminal reactive polysiloxane compound having at least one polymerizable group (hereinafter referred to as "Compound (C)") used in the curable composition of the present invention. Polymerizable unsaturated groups such as an acryloxy group, methacryloxy group, vinyl group, propenyl group, butadienyl group, styryl group, ethynyl group, cinnamoyl group, maleate group, and acrylamide group; and epoxy-substituted alkyl or alkoxy groups such as 2,3-epoxypropyloxy group and epoxycyclohexyl group can be given as examples. Of these, an acryloxy group and methacryloxy group are preferable due to the capability of providing the curable composition with radiation curability.

There are no specific limitations to the compound (C) insofar as such a compound is a terminal reactive polysiloxane compound having a polymerizable group. Polydimethylsiloxane compounds are preferable in view of easy availability. There are no specific limitations to the polydimethylsiloxane compounds insofar as the compound has a polymerizable group and two or more dimethylsiloxane structures.

The polystyrene-reduced number average molecular weight of the compound (C) determined by the GPC method is preferably from 800 to 15000, and particularly preferably from 1000 to 7000. If the number average molecular weight is less than 800, surface slip characteristics of the cured products may not be sufficient; if more than 15,000, the composition containing such a compound may have poor applicability.

Compounds shown by the following formula (11) are preferable as the compound (C).

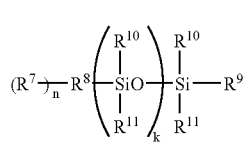

wherein $R^7$ is an organic group having a functional group selected from the group consisting of an acryloxy group, methacryloxy group, vinylether group and epoxy group, $R^8$ is an organic group having a valence of (n+1), $R^9$ is an alkyl group having 1 to 12 carbon atoms, $R^{10}$ and $R^{11}$ are individually a methyl group or phenyl group, n is a numeral from 0 to 3, and k is a numeral from 1 to 150.

An acryloxy group, methacryloxy group, 2,3-epoxypropyloxy group, and the like can be given as examples of the groups represented by $R^7$ in the formula (3).

As the group represented by $R^8$, an organic group with a valence of (n+1) having a molecular weight from 28 to 14,000, and particularly from 28 to 5000, is preferable in view of mutual solubility with other components. As the group represented by $R^8$, an organic group having an aliphatic or aromatic structure, which may include a urethane bond, ether bond, ester bond, amide bond, or the like, can be given. As examples of the aliphatic structure, a linear structure such as methylene, ethylene, propylene, tetramethylene, hexamethylene, 2,2,4-trimethylhexamethylene, and 1-(methylcarboxyl)pentamethylene; an alicyclic structure such as isophorone, cyclohexylmethane, methylenebis(4-cyclohexane), hydrogenated dienylmethane, hydrogenated xylene, and hydrogenated toluene; and an aromatic structure such as benzene, toluene, xylene, p-phenylene, diphenylmethane, diphenylpropane, and naphthalene can be given.

As commercially available products of the compound (C), Silaplane FM-0711, FM-0721, FM-0725, FM-0511, FM-0521, FM-0525, TM-0701, TM0701T (manufactured by Chisso Corp.), AK-5 (manufactured by Toagosei Co., Ltd.), and the like can be given.

Chemical structures of these commercially available compounds (C) are as follows.

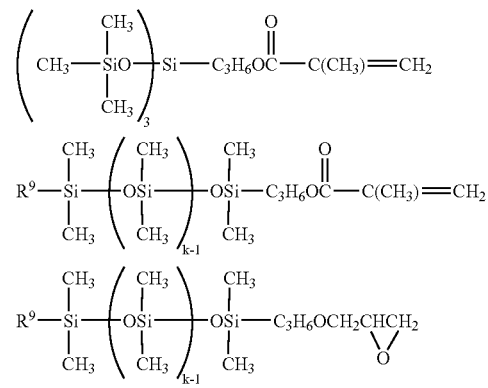

wherein k and $R^9$ are the same as previously defined.

Furthermore, use of a terminal reactive polydimethylsiloxane compound having a polymerizable unsaturated group and an urethane bond as the compound (C) in the present invention is preferable in view of superior compatibility with other components and capability of providing a curable composition with excellent applicability. The number of urethane bonds in the molecule may be either one, two or more. As a preferable example of such a terminal reactive polydimethylsiloxane compound, a compound shown by the following formula (15) can be given.

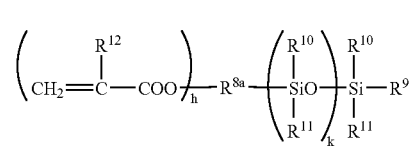

wherein $R^{8a}$ is an organic group with a valence of (n+1) containing a urethane bond, $R^{12}$ is a hydrogen atom or a methyl group, $R^9$, $R^{10}$, $R^{11}$, k, and n are the same as previously defined.

The compound of the formula (15) can be prepared by, for example, reacting a polyisocyanate, a reactive silicone compound having at least one hydroxyl group at the terminal position of the molecule, and a hydroxyl group-containing (meth)acrylate.

Examples of the polyisocyanate used in the above reaction include, but are not limited to, diisocyanate compounds such as 2,4-tolylene diisocyanate, 2,6-tolylene diisocyanate, 1,3-xylylene diisocyanate, 1,4-xylylene diisocyanate, 1,5-naphthalene diisocyanate, m-phenylene diisocyanate, p-phenylene diisocyanate, 3,3'-dimethyl-4,4'-diphenylmethane diisocyanate, 4,4'-diphenylmethane diisocyanate, 3,3'-dimethylphenylene diisocyanate, 4,4'-biphenylene diisocyanate, 1,6-hexane diisocyanate, isophorone diisocyanate, methylenebis(4-cyclohexylisocyanate), 2,2,4-trimethylhexamethylene diisocyanate, bis(2-isocyanatethyl)fumarate, 6-isopropyl-1,3-phenyl diisocyanate, 4-diphenylpropane diisocyanate, lysine isocyanate, hydrogenated diphenylmethane diisocyanate, hydrogenated xylylene diisocyanate, tetramethylxylylene diisocyanate, 2,5(or 2,6)-bis(isocyanatemethyl)-bicyclo[2.2.1]heptane, and the like. Of these, 2,4-tolylene diisocyanate, isophorone diisocyanate, xylylene diisocyanate, and methylenebis(4cyclohexylisocyanate) are particularly preferable. These compounds may be used either individually or in combinations of two or more.

The polydimethylsiloxane structure in the compound (C) can be introduced by using a silicone compound having a hydroxyl group at at least one end of the molecule (terminal) and a non-reactive organic group at the other end of the molecule, for example.

As examples of such a silicone compound, a silicone compound having a hydroxyl group at one terminal such as a polydimethylsiloxane which has an organic group such as a 3-(2'-hydroxyethoxy)propyl group, 3-(2',3'-dihydroxypropyloxy)propyl group, 3-(2'-ethyl-2'-hydroxymethyl-3-hydroxy)propyl group, or 3-(2'-hydroxy-3'-isopropylamino) propyl group at one terminal and a non-reactive organic group such as a trimethylsilyloxy group at the other terminal can be given. These compounds may be used either individually or in combinations of two or more.

The above silicone compound having a hydroxyl group at one terminal can be commercially available under the trade names of, for example, Silaplane FM-0411, FM-0421, FM-0425, FM-D411, FM-D421, FM-D425, FM-DA11, FM-DA21, FM-DA25 (manufactured by Chisso Corp.), TSL9105 (manufactured by Toshiba Silicone Co., Ltd.), and Shin-Etsu Silicone X-22-170A, X-22-170B, X-22-170D, X-22-176B, X-22-176D, X-22-176DX, X-22-178A, X-22-178B (manufactured by Shin-Etsu Chemical Co., Ltd.).

A polymerizable unsaturated group, preferably a (meth) acryloyl group, is essential in the component (C) used in the present invention to provide the curable composition with radiation curability. The (meth)acryloyl group can be introduced by reacting a hydroxyl group-containing (meth)acrylate compound and a polyisocyanate compound, for example.

Given as examples of the hydroxyl group-containing (meth)acrylate compound are (meth)acrylate compounds such as 2-hydroxyethyl(meth)acrylate, 2-hydroxypropyl (meth)acrylate, 2-hydroxybutyl(meth)acrylate, 2-hydroxybutyl(meth)acrylate, 2-hydroxy-3-phenyloxypropyl(meth) acrylate, 1,4-butanediol mono(meth)acrylate, 2-hydroxyalkyl(meth)acryloyl phosphate, 4-hydroxycyclohexyl(meth)acrylate, 1,6-hexanediol mono(meth)acrylate, neopentyl glycol mono(meth)acrylate, trimethylolpropane di(meth)acrylate, trimethylolethane di(meth)acrylate, pentaerythritol tri(meth)acrylate, dipentaerythritol penta(meth) acrylate, and (meth)acrylates represented by the following formulas (16) and (17):

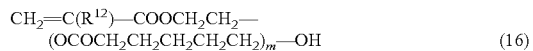
$$CH_2=C(R^{12})-COOCH_2CH_2-(OCOCH_2CH_2CH_2CH_2CH_2)_m-OH \quad (16)$$

$$CH_2=C(R^{12})-COOCH_2CH(OH)CH_2-O-(C_6H_5) \quad (17)$$

wherein $R^{12}$ represents a hydrogen atom or a methyl group and m is an integer from 1 to 15.

Compounds obtained by the addition reaction of a (meth) acrylic acid and a compound containing a glycidyl group such as an alkyl glycidyl ether, allyl glycidyl ether, and glycidyl (meth)acrylate can also be used. Of these (meth) acrylates containing a hydroxyl group, 2-hydroxyethyl (meth)acrylate and 2-hydroxypropyl (meth)acrylate are particularly preferable. These compounds may be used either individually or in combinations of two or more.

Examples of the reactions for obtaining the compound (C) having two or more urethane bonds are a method of reacting the silicone compound having a hydroxyl group, a polyisocyanate, and a hydroxyl group-containing (meth)acrylate altogether; a method of reacting the silicone compound with the polyisocyanate, and then with the hydroxyl group-containing (meth)acrylate; and a method of reacting the polyisocyanate with the hydroxyl group-containing (meth) acrylate, and then with the silicone compound. The reaction is preferably carried out by using these compounds in a proportion in which the number of hydroxyl groups (from the silicone compound having a hydroxyl group and the hydroxyl group-containing (meth)acrylate) is about equivalent to the number of isocyanate groups (from the polyisocyanate).

The polyurethane polyol structure and the like can be introduced between the polydimethylsiloxane structure and the (meth)acryloyl group by adding a polyol to the starting material of the above reaction.

Examples of methods of obtaining the compound (C) having a polyurethane polyol structure are a method of reacting the silicone compound having a hydroxyl group, a polyol, a polyisocyanate, and a hydroxyl group-containing (meth)acrylate altogether; a method of reacting the polyol with the polyisocyanate, an then with the silicone compound and hydroxyl group-containing (meth)acrylate; a method of reacting the polyisocyanate, silicone compound, and hydroxyl group-containing (meth)acrylate altogether, and the reacting the resulting mixture with the polyol; a method of reacting the polyisocyanate with the silicone compound, then with polyol, and finally with the hydroxyl group-containing (meth)acrylate; and a method of reacting the polyisocyanate with the hydroxyl group-containing (meth) acrylate, then with polyol, and finally with the silicone compound.

As examples of the polyol used here, a polyether diol, polyester diol, polycarbonate diol, polycaprolactone diol, and the like can be given. These polyols may be used either individually or in combination of two or more. There are no specific limitations to the manner of polymerization of the structural units in these polyols. Any of random polymerization, block polymerization, or graft polymerization is acceptable.

Examples of specific polyether diols include polyethylene glycol, polypropylene glycol, polytetramethylene glycol, polyhexamethylene glycol, polyheptamethylene glycol, polydecamethylene glycol, polyether diols obtained by the ring-opening copolymerization of two or more ion-polymerizable cyclic compounds, and the like. Examples of the above ion-polymerizable cyclic compounds include cyclic ethers such as ethylene oxide, propylene oxide, butene-1-oxide, isobutene oxide, 3,3-bis(chloromethyl)oxetane, tetrahydrofuran, 2-methyltetrahydrofuran, 3-methyltetrahydrofuran, dioxane, trioxane, tetraoxane, cyclohexene oxide, styrene oxide, epichlorohydrin, glycidyl methacrylate, allyl glycidyl ether, allyl glycidyl carbonate, butadiene monoxide, isoprene monoxide, vinyl oxetane, vinyl tetrahydrofuran, vinyl cyclohexene oxide, phenyl glycidyl ether, butyl glycidyl ether, and glycidyl benzoate. Examples of specific combinations of the above two or more ion-polymerizable cyclic compounds include combinations of tetrahydrofuran and propylene oxide, tetrahydrofuran and 2-methyltetrahydrofuran, tetrahydrofuran and 3-methyltetrahydrofuran, tetrahydrofuran and ethylene oxide, propylene oxide and ethylene oxide, butene-1-oxide and ethylene oxide, a ternary copolymer of tetrahydrofuran, butene-1-oxide, and ethylene oxide, and the like. A polyether diol produced by the ring-opening copolymerization of the above ion-polymerizable cyclic compounds and cyclic imines such as ethyleneimine, cyclic lactonic acids such as □-propyolactone and glycolic acid lactide, or dimethylcyclopolysiloxanes can also be used. The ring-opening copolymers of the ion-polymerizable cyclic compounds may be either a random copolymer or a block copolymer.

As examples of polyester diols, polyester diols obtained by reacting a polyhydric alcohol and a polybasic acid, and the like can be given. Examples of the polyhydric alcohol include ethylene glycol, polyethylene glycol, propylene glycol, polypropylene glycol, tetramethylene glycol, polytetramethylene glycol, 1,6-hexanediol, neopentyl glycol, 1,4-cyclohexanedimethanol, 3-methyl-1,5-pentanediol, 1,9-nonanediol, 2-methyl-1,8-octanediol, and the like. Examples of the polybasic acid include phthalic acid, isophthalic acid, terephthalic acid, maleic acid, fumaric acid, adipic acid, sebacic acid, and the like. These polyester diols are commercially available as Kurapol P-2010, PMIPA, PKA-A, PKA-A2, PNA-2000 (manufactured by Kuraray Co., Ltd.).

As examples of polycarbonate diols, polycarbonate of polytetrahydrofuran, polycarbonate of 1,6-hexanediol, and the like can be given. Commercially available products include DN-980, 981, 982, 983 (manufactured by Nippon Polyurethane Industry Co., Ltd.), PC-8000 (manufactured by PPG of the U.S.), PC-THF-CD (manufactured by BASF), and the like.

As examples of polycaprolactone diols, polycaprolactone diol obtained by reacting ε-caprolactone and a diol and the like can be given. As examples of the above diol, ethylene glycol, polyethylene glycol, propylene glycol, polypropylene glycol, tetramethylene glycol, polytetramethylene glycol, 1,2-polybutylene glycol, 1,6-hexanediol, neopentyl glycol, 1,4-cyclohexanedimethanol, 1,4-butanediol, and the like can be given. As examples of commercially available products of these polycaprolactone diols, PLACCEL 205, 205AL, 212, 212AL, 220, 220AL (manufactured by Daicel Chemical Industries, Ltd.), and the like can be given.

Examples of polyols other than the above polyols include ethylene glycol, propylene glycol, 1,4-butanediol, 1,5-pentanediol, 1,6-hexanediol, neopentyl glycol, 1,4-cyclohexanedimethanol, hydrogenated bisphenol A, hydrogenated bisphenol F, dimethylol compound of dicyclopentadiene, tricyclodecanedimethanol, pentacyclopentadecanedimethanol, β-methyl-δ-valerolactone, hydroxy-terminated polybutadiene, hydroxy-terminated hydrogenated polybutadiene, castor oil-modified polyol, diol-terminated polydimethylsiloxane compounds, polydimethylsiloxane carbitol-modified polyol, and the like.

The molecular weight of the polyols, in terms of the polystyrene-reduced number average molecular weight, is usually from 50 to 15,000, and preferably from 100 to 8,000.

The proportion of the compound (C) used in the present invention is preferably 0.01–5 wt %, and still more preferably 0.01–2 wt % of 100 wt % of the composition (total weight of reactive particles (A), compound (B), and compound (C)). If the proportion is less than 0.01 wt %, surface slip characteristics of the cured products may be insufficient; if more than 5 wt %, applicability of the composition may become poor, for example the composition may be repelled when applied to a substrate. Preferably the cured products have a shear lubricity force of less than 20 N, more preferably less than 10 N, when subjected to a shear lubricity test at a tensile rate of 50 mm/minute with a contact area of 5.4 $cm^2$ and pressure of 4.7 $N/cm^2$ applied from two double clips as disclosed in the experimental part of the specification.

4. Antioxidant (D)

Additionally to the above ingredients an antioxidant (D) may be used in the present invention. Preferably this antioxidant (D) is a hindered phenol-type antioxidant.

In the present invention, the hindered phenol-type antioxidant is a compound having an oxidation prevention function which preferably has substituents exhibiting a steric hindrance effect at the ortho position (2-position and/or 6-position) of a phenolic hydroxyl group. As examples of the substituents exhibiting a steric hindrance effect, a t-butyl group, 1-methylpentadecyl group, octylthiomethyl group, and the like can be given. Two substituents at the 2-position and 6-position possessed by a hindered phenol-type antioxidant may be either the same or different. As preferable examples of compounds having such substituents, compounds having a (3,5-di-t-butyl-4-hydroxyphenyl) group can be given.

Specific examples include the following compounds: pentaerythritoltetrakis[3-(3,5-di-t-butyl-4-hydroxyphenyl)propionate], thiodiethylenebis[3-(3,5-di-t-butyl-4-hydroxyphenyl)propionate], octadecyl-3-(3,5-di-t-butyl-4-hydroxyphenyl)propionate, N,N'-hexane-1,6-diylbis[3-(3,5-di-t-butyl4-hydroxyphenyl)propionamide], isooctyl-3,5-bis(1,1-dimethylethyl)-4-hydroxybenzenepropionate, 2,4-dimethyl-6-(1-methylpentadecyl)phenol, diethyl[[3,5-bis(1,1-dimethylethyl)-4-hydroxyphenyl]methyl]phosphonate, 3,3'3",5,5'5"-hexa-t-butyl-a,a'a"-(mesitylene-2,4,6-triyl)tri-p-cresol, calcium diethylbis[[[3,5-bis(1,1-dimethylethyl)-4-hydroxyphenyl]methyl]phosphonate], 4,6-bis(octylthiomethyl)-o-cresol, ethylenebis(oxyethylene)bis[3-(5-t-butyl-4-hydroxy-m-tolyl)propionate], hexamethylenebis[3-(3,5-di-t-butyl-4-hydroxyphenyl)propionate], 1,3,5-tris(3,5-di-t-butyl-4-hydroxybenzyl)-1,3,5-triazine-2,4,6(1H, 3H, 5H)-trione, a reaction product of N-phenylbenzeneamine and 2,4,4-trimethylpentene, 2,6-di-t-butyl-4-(4,6-bis(octylthio)-1,3,5-triazin-2-ylamino)phenol, bis(1,2,2,6,6-pentamethyl-4-piperidyl)[[3,5-bis(1,1-dimethylethyl)hydroxyphenyl]butylmalonate, 1-[2-[3-(3,5-di-t-butyl-4-hydroxyphenyl)propionyloxy]ethyl]-4-[3-(3,5-di-t-butyl-4-hydroxyphenyl)propionyloxy]-2,2,6,6-tetramethylpiperidine, and 4-benzoyloxy-2,2,6,6-tetramethylpiperidine.

Of these, pentaerythritoltetrakis[3-(3,5-di-t-butyl-4-hydroxyphenyl)propionate], octadecyl-3-(3,5-di-t-butyl-4-hydroxyphenyl)propionate, isooctyl-3,5-bis(1,1-dimethylethyl)-4-hydroxybenzenepropionate, and hexamethylenebis[3-(3,5-di-t-butyl-4-hydroxyphenyl)propionate are preferable.

As commercially available products of these compounds, Irganox 1010, 1010FP, 1010FF, 1035, 1035FF, 1076, 1076FF, 1076FD, 1098, 1135, 1141, 1222, 1330, 1425WL, 1520L, 1520LR, 245, 245FF, 259, 3114, 5057, 565, 565FL (manufactured by Ciba Specialty Chemicals Co., Ltd.), and the like can be given.

5. Light Stabilizer (E)

Additional to the components (A), (B), (C) and optionally (D) a light stabilizer (E) may be used in the present invention. Preferably this light stabilized (E) is a hindered amine-type light stabilizer. Preferably a hindered phenol-type antioxidant (D) and hindered amine-type light stabilizer (E) are present at the same time.

In the present invention, the hindered amine-type light stabilizer is a compound having a light stabilization function, which preferably has a piperidine ring containing substituents exhibiting a steric hindrance effect on two carbon atoms adjacent to a nitrogen atom. As examples of the substituents exhibiting a steric hindrance effect, a methyl group and the like can be given.

As preferable examples of compounds having such substituents, compounds having a 2,2,6,6-tetramethyl-4-piperidyl group, compounds having a 1,2,2,6,6-pentamethyl-4-piperidyl group, and the like can be given.

Specific examples include the following compounds: N,N', N'', N'''-tetrakis(4,6-bis-(butyl-(N-methyl-2,2,6,6-tetramethylpiperidin-4-yl)amino)-triazin-2-yl)-4,7-diazadecane-1,10-diamine, polycondensation product of dibutylamine. 1,3,5-triazine. N,N'-bis(2,2,6,6-tetramethyl-4-piperidyl)-1,6-hexamethylenediamine. N-(2,2,6,6-tetramethyl-4-piperidyl)butylamine, poly[{6-(1,1,3,3-tetramethylbutyl)amino-1,3,5-triazine-2,4-diyl}{(2,2,6,6-tetramethyl-4-piperidyl)imino}hexamethylene{(2,2,6,6-tetramethyl-4-piperidyl)imino}], a polymer of dimethyl succinate-4-hydroxy-2,2,6,6-tetramethyl-1-piperidineethanol, a reaction product of ecanedioic acid bis(2,2,6,6-tetramethyl-1-(octyloxy)-4-piperidinyl)ester and 1,1-dimethylethyl hydroperoxide-octane, bis(1,2,2,6,6-pentamethyl-4-piperidyl)[[3,5-bis(1,1-dimethylethyl)-4-hydroxyphenyl] methyl]butylmalonate, bis(1,2,2,6,6-pentamethyl-4-piperidyl)sebacate, a mixture of bis(1,2,2,6,6-pentamethyl-4-piperidyl)sebacate and methyl-1,2,2,6,6-pentamethyl-4-piperidyl sebacate, bis(2,2,6,6-tetramethyl-4-piperidyl) sebacate, polycondensation product of dimethyl-1-(2-hydroxyethyl)-4-hydroxy-2,2,6,6-tetremethylpiperidine succinate, N,N'''-1,2-ethanediylbis[N-[3-[[4,6-bis[butyl(1,2,2,6,6-pentamethyl-4-piperidyl)amino]-1,3,5-triazin-2-yl] amino]propyl]-N',N''-dibutyl-N',N''-bis(1,2,2,6,6-pentamethyl-4-piperidyl)-1,3,5-triazine-2,4,6-triamine], 1-(methyl)-8-(1,2,2,6,6-pentamethyl-4-piperidyl)sebacate, 1-[2-[3-(3,5-di-t-butyl-4-hydroxyphenyl)propionyloxy] ethyl]-4-[3-(3,5-di-t-butyl-4-hydroxyphenyl)propionyloxy]-2,2,6,6-tetramethylpiperidine, 4-benzoyloxy-2,2,6,6-tetramethylpiperidine, and 8-acetyl-3-dodecyl-7,7,9,9-tetramethyl-1,3,8-triazaspiro[4.5]decane-2,4-dione.

Of these, bis(1,2,2,6,6-pentamethyl-4-piperidyl)sebacate and bis(2,2,6,6-tetramethyl-4-piperidyl)sebacate are preferable.

As commercially available products of these compounds and compositions containing these compounds, Chimassorb 119FL, 2020FDL, 944FD, 944LD, Tinuvin 622LD, 123S, 144, 765, 770, 770DF, 770FL, 111FD, 123, 292 (manufactured by Ciba Specialty Chemicals Co., Ltd.), Sanol LS-770, LS-765, LS-292, LS-2626, LS-744, LS-440 (manufactured by Sankyo Co., Ltd.), and the like can be given.

The amount of the antioxidant (D) to be added is preferably 0.001–9 parts by weight, still more preferably 0.002–4.5 parts by weight, and particularly preferably 0.005–1.8 parts by weight for 100 parts by weight of the total solid content of the reaction product (A) and the compounds (B) and (C). If the amount is less than 0.001 part by weight, light resistance such as yellowing resistance of the resulting cured film may be insufficient. If the amount is more than 9 parts by weight, curing of the composition may be hindered or hardness and scratch resistance of the cured film may be insufficient.

The amount of the light stabilizer (E) to be added is preferably 0.001–9 parts by weight, still more preferably 0.002–4.5 parts by weight, and particularly preferably 0.005–1.8 parts by weight for 100 parts by weight of the total solid content of the reaction product (A) and the compounds (B) and (C). If the amount is less than 0.001 part by weight, light resistance such as yellowing resistance of the resulting cured film may be insufficient. If the amount is more than 9 parts by weight, curing of the composition may be hindered or hardness and scratch resistance of the cured film may be insufficient.

The total amount of the antioxidant (D) and the light stabilizer (E) to be added is preferably 0.01–10 parts by weight, still more preferably 0.02–5 parts by weight, and particularly preferably 0.05–2 parts by weight for 100 parts by weight of the total solid content of the reaction product (A) and the compounds (B) and (C).

Even if the respective amount of the antioxidant (D) and the light stabilizer (E) is less than 9 parts by weight for 100 parts by weight of the total solid content of the reaction product (A) and the compounds (B) and (C), curing of the composition may be hindered or hardness and scratch resistance of the cured film may be insufficient if the total amount of the antioxidant (D) and the light stabilizer (E) is more than 10 parts by weight. Even if the respective amount of the antioxidant (D) and the light stabilizer (E) is more than 0.001 part by weight for 100 parts by weight of the total solid content of the reaction product (A) and the compounds (B) and (C), light resistance such as yellowing resistance of the resulting cured film may be insufficient if the total amount of the antioxidant (D) and the light stabilizer (E) is less than 0.01 part by weight.

6. Polymerization Initiator (F)

The curable resin composition of the present invention is cured using heat or radiation. In order to increase the curing speed, a heat-polymerization initiator and/or a radiation (photo)-polymerization initiator may be added as the polymerization initiator (F).

In the present invention, radiation refers to visible rays, ultraviolet rays, deep ultraviolet rays, X-rays, electron beams, α-rays, β-rays, γ-rays, and the like.

The amount of the polymerization initiator (F) to be added is preferably 0.01–20 parts by weight, and still more preferably 0.1–10 parts by weight for 100 parts by weight of the total solid content of the reaction product (X) and the compound (B). The polymerization initiator (F) may be used either individually or in combination of two or more.

As examples of a radiation(photo)-polymerization initiator, 1-hydroxycyclohexyl phenyl ketone, 2,2-dimethoxy-2-phenylacetophenone, xanthone, fluorenone, benzaldehyde, fluorene, anthraquinone, triphenylamine, carbazole, 3-methylacetophenone, 4-chlorobenzophenone, 4,4'-dimethoxybenzophenone, 4,4'-diaminobenzophenone, Michler's ketone, benzoin propyl ether, benzoin ethyl ether, benzyl dimethyl ketal, 1-(4-isopropylphenyl)-2-hydroxy-2-methylpropan-1-one, 2-hydroxy-2-methyl-1-phenylpropan-1-one, thioxanethone, diethylthioxanthone, 2-isopropylthioxanthone, 2-chlorothioxanthone, 2-methyl-1-[4-(methylthio) phenyl]-2-morpholino-propan-1-one, 2,4,6-trimethylbenzoyldiphenylphosphine oxide, bis-(2,6-dimethoxybenzoyl)-2,4,4-trimethylpentylphosphine oxide, and the like can be given.

Of these, 1-hydroxycyclohexyl phenyl ketone, 2,2-dimethoxy-2-phenylacetophenone, 2-methyl-1-[4-(methylthio)phenyl]-2-morpholino-propan-1-one, 2,4,6-trimethylbenzoyldiphenylphosphine oxide, bis-(2,6-dimethoxybenzoyl)-2,4,4-trimethylpentylphosphine oxide are particularly preferable.

As commercially available products of the radiation (photo)-polymerization initiator, Irgacure 184, 369, 651, 500, 907, CGI1700, CGI1750, CGI1850, CG24-61, Darocur 1116, 1173 (manufactured by Ciba Specialty Chemicals Co., Ltd.), Lucirin TPO (manufactured by BASF), Ubecryl P36

(manufactured by UCB), and the like can be given. Of these, Irgacure 184, 651, 907, Darocur 1173, and Lucirin TPO are preferable.

As examples of a heat-polymerization initiator, peroxides, azo compounds, and like can be given. Specific examples include benzoyl peroxide, t-butyl-peroxybenzoate, azobisisobutyronitrile, and the like.

In the present invention, the photo-polymerization initiator and the heat-polymerization initiator may be used in combination.

7. Antistatic Agent

An antistatic agent may be added to the curable resin composition of the present invention to provide the composition with antistaticity.

As the antistatic agent, any of anionic-type, cationic-type, dipolar ionic-type, and nonionic-type antistatic agents may be used.

As examples of anionic-type antistatic agents, alkyl sulfonate, alkylbenzene sulfonate, alkyl sulfate, alkylethoxy sulfate, alkyl phosphate, and the like can be given.

As examples of cationic-type antistatic agents, alkyltrimethyl ammonium salt, acyloylamidepropyltrimethyl ammonium methosulfate, alkylbenzyldimethyl ammonium salt, acylchlorinated choline, and the like can be given.

As examples of dipolar ionic-type antistatic agents, alkylbetainetype, alkylimidazoline-type, alkylalanine-type antistatic agents, and the like can be given.

As examples of nonionic-type antistatic agents, fatty acid alkylolamide, di-(2-hydroxyethyl)alkylamine, polyoxyethylenealkylamine, fatty acid glycerol ester, polyoxyethylene glycol fatty acid ester, sorbitan fatty acid ester, polyoxysorbitan fatty acid ester, polyoxyethylene alkyl phenyl ether, polyoxyethylene alkyl ether, and the like can be given.

The amount of the antistatic agents to be added is preferably 0.01–20 parts by weight, and still more preferably 0.1–10 parts by weight for 100 parts by weight of the total solid content of the reaction product (X) and the compound (B). If the amount is less than 0.01 part by weight, an antistatic effect may be insufficient. If the amount is more than 20 parts by weight, scratch resistance of the cured product may be insufficient.

The antistatic agents may be used either individually or in combination of two or more.

The addition of the antistatic agent to the curable resin composition of the present invention ensures formation of a cured product with a surface specific resistivity of $10^{12}$ Ω or less.

8. Other Additives

In the present invention, various additives may be added to the composition in addition to the above components. As examples of additives, UV absorbers (hereinafter may be called "UV absorbers (G)"), silane coupling agents, aging preventives, heat-polymerization inhibitors, coloring agents, leveling agents, surfactants, preservatives, plasticizers, lubricants, inorganic fillers, organic fillers, wettability improvers, coating surface improvers, and the like can be given.

As commercially available products of the UV absorbers (G), Tinuvin P (manufactured by Ciba Specialty Chemicals Co., Ltd.), Seesorb 103 (manufactured by Shipro Kasei K. K.), and the like can be given. As examples of silane coupling agents, γ-aminopropyltriethoxysilane, γ-mercaptopropyltrimethoxy silane, and γ-methacryloxypropyltrimethoxysilane, commercially available products such as SH6062, SZ6030 (manufactured by Toray-Dow Corning Silicone Co., Ltd.), KBE 903, KBM803 (manufactured by Shin-Etsu Silicone Co., Ltd.), and the like can be given. As examples of aging preventives, Antigene W, S, P, 3C, 6C, RD-G, FR, AW (manufactured by Sumitomo Chemical Co., Ltd.), and the like can be given.

The composition of the present invention, which comprises the antioxidant (D) and the light stabilizer (E), exhibits superior light resistance or the like in comparison with the composition which comprises the UV absorbers (F) instead of the antioxidant (D) and the light stabilizer (E).

II. Cured Film

1. Method of Laminating the Composition on Substrate

There are no specific limitations to the method of laminating the composition of the present invention on a substrate. For example, a method of applying the composition to a substrate can be given.

As examples of a substrate to which the composition is applied, plastics (polycarbonate, polymethacrylate, polystyrene, polyester, polyolefin, epoxy resins, melamine resins, triacetylcellulose resins, ABS resins, AS resins, norbornene resins, etc.), metals, wood, paper, glass, slates, and the like can be given. The substrate may be a plate, film, or three-dimensional molded body. As a method of applying the composition, dip coating, spray coating, flow coating, shower coating, roll coating, spin coating, screen printing, ink jet printing, brush coating, or the like can be employed. The thickness of the film after curing and drying is preferably 0.05–400 µm, and still more preferably 1–200 µm.

The composition of the present invention may be diluted with a solvent to adjust the formulation viscosity and thereby the film thickness. The viscosity of the composition used as a hard coat for a plastic lens, for example, is usually 0.1–10,000 mPa.s/25° C., and preferably 0.5–2,000 mPa.s/25° C.

2. Method of Curing the Composition

The composition of the present invention is cured using radiation (light) or the like.

There are no specific limitations to the source of radiation insofar as the composition is cured in a short period of time after being applied. As examples of the source of infrared rays, a lamp, resistance heating plate, laser, and the like can be given. As examples of the source of visible rays, sunlight, a lamp, fluorescent lamp, laser, and the like can be given. As the source of ultraviolet rays, a mercury lamp, halide lamp, laser, and the like can be given. As examples of the source of electron beams, a system of utilizing thermoelectrons produced by a commercially available tungsten filament, a cold cathode method generating electron beams by passing a high voltage pulse through a metal, and a secondary electron method which utilizes secondary electrons produced by the collision of ionized gaseous molecules and a metal electrode can be given. As the source of α-rays, β-rays, and γ-rays, fissionable substances such as $Co^{60}$ and the like can be given. For γ-rays, a vacuum tube which causes an acceleration electron to collide with an anode and the like can be used. The radiation can be used either individually or in combination of two or more. In the latter case, two or more types of radiation may be used either simultaneously or with certain intervals of time.

As a specific example of forming a cured film, a method of applying the composition to a substrate, removing volatile components by drying at a temperature of preferably 0–200° C., and curing the composition using heat and/or radiation can be given. Curing using heat is preferably carried out at 20–150° C. for 10 seconds to 24 hours. When using radiation, use of ultraviolet rays or electron beams is preferable. The dose of ultraviolet rays is preferably 0.01–10 J/cm², and still more preferably 0.1–2 J/cm². Electron beams are preferably irradiated with an accelerated voltage of 10–300 KV and an electron density of 0.02–0.30 mA/cm² at a dose of 1–10 Mrad.

III. Composite Product

The composite product of the present invention is prepared by laminating the cured film on the substrate.

Among composite products in which the cured film is laminated on various substrates, a composite product in which the cured film is laminated on a plastic lens (for example, lenses of glasses to be exposed to sunlight) is particularly suitable, because the cured film has excellent light resistance such as yellowing resistance.

EXAMPLES

The present invention will be described in more detail by examples, which should not be construed as limiting the present invention. In the following examples, "parts" and "%" respectively refer to "parts by weight" and "wt %" unless otherwise indicated.

In the present invention, "solid content" refers to the content of components excluding volatile components such as solvents from the dispersion liquid, specifically, "solid content" refers to the content of a residue (nonvolatile components) obtained by drying the composition on a hot plate at 175° C. for one hour.

Synthesis of Organic Compound (A2)

Synthesis Example 1

20.6 parts of isophorone diisocyanate was added to a solution of 7.8 parts of mercaptopropyltrimethoxysilane and 0.2 part of dibutyltin dilaurate in dry air in one hour while stirring at 50° C. The mixture was stirred for a further three hours at 60° C. After the addition of 71.4 parts of pentaerythritol triacylate dropwise in one hour at 30° C., the mixture was stirred for a further three hours at 60° C. while heating to obtain an organic compound (A2-1). The amount of isocyanate remaining in the product was analyzed to find that the amount was 0.1% or less, indicating that the reaction was completed almost quantitatively.

Preparation of Reactive Particles (A)

Preparation Examples 1 to 4 illustrate examples of preparing reactive particles (A). The results are summarized in Table 1.

Preparation Example 1

A mixture of 8.7 parts of the organic compound (A2-1) synthesized in Synthesis Example 1, 91.3 parts of a methyl ethyl ketone silica sol (MEK-ST manufactured by Nissan Chemical Industries, Ltd., number average particle diameter: 0.022 μm, silica concentration: 30%), and 0.1 part of ion-exchanged water was stirred at 60° C. for 3 hours. After the addition of 1.4 parts of methyl orthoformate, the mixture was stirred at the same temperature for one hour while heating to obtain a dispersion liquid of the reactive particles (A) (dispersion liquid (A-1)). 2 g of the dispersion liquid (A-1) was weighed on an aluminum dish and dried on a hot plate at 175° C. for one hour. The dried material was weighed to confirm that the solid content was 19%.

Preparation Example 2

A mixture of 2.1 parts of the organic compound (A2-1) prepared in Synthesis Example 1, 97.9 parts of methyl ethyl ketone zirconia sol (number average particle diameter: 0.01 μm, zirconia concentration: 30%), and 0.1 part of ion-exchanged water was stirred at 60° C. for 3 hours, followed by the addition of 1.0 part of methyl orthoformate. The mixture was stirred for one hour while heating at the same temperature to obtain a dispersion liquid of reactive particles (A) (dispersion liquid (A-2)). The solid content of this dispersion liquid (A-2) was determined in the same manner as in Preparation Example 1 to confirm that the solid content was 19%.

Preparation Example 3

A mixture of 4.8 parts of the organic compound (A2-1) synthesized in Synthesis Example 1, 95.2 parts of isopropanol alumina sol (AS-150I manufactured by Sumitomo Osaka Cement Co., Ltd., number average particle diameter: 0.013 μm, alumina concentration: 15%,), 0.01 part of p-methoxyphenol, and 0.1 part of ion-exchanged water was stirred at 60° C. for 3 hours. After the addition of 1.0 part of methyl orthoformate, the mixture was stirred for one hour while heating at the same temperature to obtain a dispersion liquid of reactive particles (A) (dispersion liquid (A-3)). The solid content of this dispersion liquid (A-3) was determined in the same manner as in Preparation Example 1 to confirm that the solid content is 19%.

Preparation Example 4

A mixture of 8.7 parts of the organic compound (A2-1) synthesized in Synthesis Example 1, 91.3 parts of a methyl ethyl ketone silica sol (A1-1) ("MEK-ST" manufactured by Nissan Chemical Industries, Ltd., number average particle diameter: 0.022 μm, silica concentration: 30%), 0.01 part of p-methoxyphenol, and 0.1 part of ion-exchanged water was stirred at 60° C. for 4 hours in a nitrogen stream. After the addition of 1.4 parts of methyl orthoformate, the mixture was stirred at 80° C. for one hour to obtain a colorless transparent dispersion liquid of a reaction product (X) (dispersion liquid "A-4"). 2 g of the dispersion liquid "A-4" weighed on an aluminum dish was dried on a hot plate at 120° C. for one hour. The dried product was weighed and found that the solid content was 36%.

TABLE 1

|  | PreparationExample | | | |
|---|---|---|---|---|
|  | 1 | 2 | 3 | 4 |
| Dispersion liquid of reactive particles (A) | A-1 | A-2 | A-3 | A-4 |
| Organic compound |  |  |  |  |
| A2-1 | 8.7 | 2.1 | 4.8 | 8.7 |
| Oxide particle sol |  |  |  |  |
| A1-1 | 91.3 |  |  | 91.3 |
| A1-2 |  | 97.9 |  |  |
| A1-3 |  |  | 95.2 |  |
| Ion-exchanged water | 0.1 | 0.1 | 0.1 | 0.1 |
| Methyl orthoformate | 1.4 | 1.0 | 1.0 | 1.4 |
| p-Methoxyphenol |  |  | 0.01 | 0.01 |

TABLE 1-continued

| | Preparation Example | | | |
|---|---|---|---|---|
| | 1 | 2 | 3 | 4 |
| Solid components (%) | 35 | 31 | 19 | 36 |
| Proportion of oxide particles in solid components (%) | 76 | 93 | 72 | 76 |

The meanings for the symbols in Table 1 are as follows.
A-1: Dispersion liquid of reactive particles (A) prepared in Preparation Example 1
A-2: Dispersion liquid of reactive particles (A) prepared in Preparation Example 2
A-3: Dispersion liquid of reactive particles (A) prepared in Preparation Example 3
A-4: Dispersion liquid of reactive particles (A) prepared in Preparation Example 4
A1-1: Methyl ethyl ketone silica sol (silica concentration: 30%)
A1-2: Methyl ethyl ketone zirconia sol (zirconia concentration: 30%)
A1-3: Isopropanol alumina sol (alumina concentration: 15%)
A2-1: Organic compound synthesized in Synthetic Example 1

Synthesis of Terminal Reactive Polydimethylsiloxane Compound (C)

Synthesis of the compound (C) is shown in the following Synthesis Examples 2–5.

Synthesis Example 2

A reaction vessel equipped with a stirrer was charged with 16.6 parts of isophorone diisocyanate, 0.08 part of dibutyltin dilaurate, and 0.02 part of 2,6-di-t-butyl-p-cresol. The mixture was cooled to 15° C. or less. 8.7 parts of hydroxyethyl acrylate was added dropwise while controlling the temperature at 30° C. or lower with stirring. After the addition, the mixture was allowed to react at 30° C. for one hour. Next, 74.7 parts of α-[3-(2'-hydroxyethoxy)propyl]-ω-trimethylsilyloxypolydimethylsiloxane with a hydroxyl group equivalent of 1,000 (Silaplane FM-0411 manufactured by Chisso Corp.) was added and the mixture was stirred at 20–55° C. The reaction was terminated when the residual isocyanate was 0.1 wt % or less. The number average molecular weight of the resulting polydimethylsiloxane compound (determined by measuring the polystyrene-reduced number average molecular weight by using the AS-8020 (manufactured by Tosoh Corp.) by gel permeation chromatography) was 1,400. The liquid terminal reactive polydimethylsiloxane compound thus obtained is referred to as C-1.

Synthesis Example 3

A reaction vessel equipped with a stirrer was charged with 2.8 parts of tolylene diisocyanate, 95.4 parts of α-[3-(2'-hydroxyethoxy)propyl]-ω-trimethylsilyloxy polydimethylsiloxane with a hydroxyl group equivalent of 6,000 (Silaplane FM-0421 manufactured by Chisso Corp.), and 0.02 part of 2,6-di-t-butyl-p-cresol as a polymerization inhibitor. The mixture was cooled with ice to a temperature of 10° C. or lower while stirring. After the temperature became 10° C. or less, 0.08 part of dibutyltin dilaurate was added. The mixture was stirred for one hour while controlling the temperature at 20–30° C., then for two hours at 40–50° C. Then, 1.8 parts of hydroxyethyl acrylate was added and the mixture was stirred for 3 hours at 50–60° C. The reaction was terminated when the residual isocyanate content was 0.1 wt % or less. The number average molecular weight of the resulting polydimethylsiloxane compound was 6,100. The liquid terminal reactive polydimethylsiloxane compound thus obtained is referred to as C-2.

Synthesis Example 4

A reaction vessel equipped with a stirrer was charged with 15.3 parts of tolylene diisocyanate, 95.4 parts of α-[3-(2',3'-dihydroxyethoxy)propyl]-ω-trimethylsilyloxypolydimethylsiloxane with a hydroxyl group equivalent of 6,000 (Silaplane FM-D411 manufactured by Chisso Corp.), and 0.02 part of 2,6-di-t-butyl-p-cresol. The mixture was cooled with ice to a temperature of 10° C. or lower while stirring. After the temperature became 10° C. or less, 0.08 part of dibutyltin dilaurate was added. The mixture was stirred for one hour while controlling the temperature at 20–30° C., then for two hours at 40–50° C. Then, 10.2 parts of hydroxyethyl acrylate was added and the mixture was stirred for 3 hours at 50–60° C. The reaction was terminated when the residual isocyanate content was 0.1 wt % or less. The number average molecular weight of the resulting polydimethylsiloxane compound was 1,800. The liquid terminal reactive polydimethylsiloxane compound thus obtained is referred to as –3.

Preparation Example of Composition

Examples for the preparation of the compositions of the present invention are shown in Examples 1–7 and the preparation of comparative compositions are shown in the Comparative experiments 1–2. The weight ratio of each component is shown in Table 2.

Example 1

151.4 parts of the dispersion liquid (A-1) prepared in Preparation Example 1 (reactive particles: 53.0 parts, dispersion medium: methyl ethyl ketone), 0.2 part of the terminal reactive polydimethylsiloxane compound (C-1) prepared in Synthesis Example 2, 46.8 parts of dipentaerythritol hexaacrylate, 0.9 part of 1-hydroxycyclohexyl phenyl ketone, and 0.9 part of 2-methyl-1-(4-(methylthio)phenyl)-2-morpholinopropanone-1 were stirred at 50° C. for two hours to obtain a composition in the form of a homogeneous solution. The solid content of the composition measured in the same manner as in Preparation Example 1 was 51%.

Example 2

151.4 parts of the dispersion liquid (A-1) prepared in Preparation Example 1 (reactive particles: 53.0 parts, dispersion medium: methyl ethyl ketone) was condensed to a liquid volume of 63.2 parts under reduced pressure using a rotary evaporator. To the condensed liquid, 57.6 parts of propylene glycol monomethyl ether acetate (PGMEA), 0.2 part of the terminal reactive polydimethylsiloxane compound (C-1) prepared in Synthesis Example 2, 46.8 parts of dipentaerythritol hexaacrylate, 0.9 part of 1-hydroxycyclohexyl phenyl ketone, and 0.9 part of 2-methyl-1-(4-(methylthio)phenyl)-2-morpholinopropanone-1 were added, and the mixture was stirred at 50° C. for two hours to obtain a composition in the form of a homogeneous solution. The solid content of the composition measured in the same manner as in Preparation Example 1 was 60%.

Examples 3, 5 and 6

Compositions for Examples 3, 5, and 6 were prepared in the same manner as in Example 1 except for using the components shown in Table 2.

Example 4

A composition for Example 4 was prepared in the same manner as in Example 2 except for using the components shown in Table 2.

Example 7

151.4 parts of the dispersion liquid (A-1) prepared in Preparation Example 1 (reactive particles: 53.0 parts, dispersion medium: methyl ethyl ketone), 0.2 part of the terminal reactive polydimethylsiloxane compound (Silaplane FM-0711 manufactured by Chisso Corp., number average molecular weight 1000), 25.0 parts of dipentaerythritol hexaacrylate, 0.9 part of 1-hydroxycyclohexyl phenyl ketone, and 0.9 part of 2-methyl-1-(4-(methylthio)phenyl)-2-morpholinopropanone-1 were was stirred at 50° C. for two hours to obtain a composition in the form of a homogeneous solution. The solid content of the composition measured in the same manner as in Preparation Example 1 was 51%.

Comparative experiments 1–2

Compositions of Comparative experiments 1 and 2 were prepared in the same manner as in Example 1 except for using the components shown in Table 2.

Evaluation of Curable Compositions and Cured Products

To demonstrate the effects of the composition of the present invention, applicability of the compositions and the cured products obtained from the compositions by coating, drying, and exposure to radiation were evaluated. The evaluation methods are described below. The evaluation results are shown in Table 2.

1. Conditions of Applying, Drying, and Curing the Composition (1) Cured Product

Each composition obtained in Examples 1-7 and Comparative experiments 1-2 was applied to a substrate (glass or PET-film) using a bar coater so that the thickness after drying was 5 μm. The composition was dried at 80° C. in a hot blast oven for 3 minutes and then irradiated at a dose of 1 J/cm² using a conveyer-type mercury lamp to obtain a cured product. The pencil hardness, adhesion to substrates, steel wool (SW) scratch resistance, and surface slip characteristics of the cured product were evaluated. The results are shown in Table 2.

As the substrate, glass was used for evaluation of pencil hardness. For evaluation of adhesion to substrates, steel wool (SW) scratch resistance, and surface slip characteristics, a polyethylene terephthalate (PET) film with a thickness of 188 μm was used.

(2) Evaluation Methods 2.1 Pencil Hardness

Cured coatings on the glass substrates were evaluated according to JIS K5400.

2.2 Adhesion to Substrate

The number of remaining 1 mm×1 mm squares among 100 squares in the cellophane tape cross-cut peeling test according to JIS K5400 was counted and the percentage was determined to evaluate the adhesion.

2.3 Steel Wool (SW) Scratch Resistance

The Gakushin-type abrasion tester manufactured by Tester Industry Co., Ltd. was reciprocated 30 times using #0000 steel wool with a load of 500 g to evaluate scratch conditions of the coating film surface by naked eye observation. The case where no scratch was observed was evaluated as "Good", and the case where a scratch was observed was evaluated as "Bad".

2.4 Surface Slip Characteristics

The PET film with the cured product of the composition of the present invention coated on the surface was cut into a stripe with a width of 3 cm and secured on an aluminum sheet with the coated surface upside using a double-sided tape. Two pieces of the test specimens were superposed one another with the cured surface face-to-face, a release paper "separate 64GW", from Oji paper Co. Ltd was provided on the two outer sides of the aluminum sheet, the sheets were fastened with two double clip at either side of the test piece, and subjected to the test for surface slip characteristics (see FIG. 1).

Specifically, the test specimens were subjected to the shear lubricity test at a tensile rate of 50 mm/minute with a contact area of 5.4 cm² and pressure of 4.7 N/cm² applied from the double clip. The shear lubricity force was measured from the load when the test specimens slipped (unit: N).

2.5 Appearance and Transparency of Coating

Appearance and transparency of the resulting coating were observed to evaluate the presence or absence of unusual matters and abnormalities such as coating unevenness, repellency, whiteness, etc. The samples in which no such abnormalities were found were rated as "Good", otherwise the samples were rated as "Bad".

TABLE 2

|  | Examples | | | | | | | Comparative experiments | |
| --- | --- | --- | --- | --- | --- | --- | --- | --- | --- |
|  | 1 | 2 | 3 | 4 | 5 | 6 | 7 | 1 | 2 |
| Reactive particles (A) | | | | | | | | | |
| A-1 | 53.0 | 53.0 | 53.0 | — | — | — | 53.0 | 53.0 | — |
| A-2 | — | — | — | 76.4 | — | — | — | — | — |
| A-3 | — | — | — | — | 55.6 | 55.6 | — | — | — |

TABLE 2-continued

|  | Examples | | | | | | | Comparative experiments | |
| --- | --- | --- | --- | --- | --- | --- | --- | --- | --- |
|  | 1 | 2 | 3 | 4 | 5 | 6 | 7 | 1 | 2 |
| Oxide particles | | | | | | | | | |
| A1-1 | — | — | — | — | — | — | — | — | 40.0 |
| Compound (C) | | | | | | | | | |
| C-1 | 0.2 | 0.2 | — | 0.2 | 0.5 | — | — | — | 0.2 |
| C-2 | — | — | 0.05- | — | — | — | — | — | — |
| C-3 | — | — | — | — | — | 0.1 | — | — | — |
| FM-0711 | — | — | — | — | — | — | 2.0 | — | — |
| Compound (B) | | | | | | | | | |
| B-1 | 46.8 | 46.8 | 46.95 | 46.8 | 46.8 | 22.1 | 25.0 | 46.8 | 46.8 |
| B-2 | — | — | — | — | — | 22.2 | 20.0 | — | — |
| Radical polymerization initiator (F) | | | | | | | | | |
| F-1 | 0.9 | 0.9 | 0.9 | 0.9 | 0.9 | 0.9 | 0.9 | 0.9 | 0.9 |
| F-2 | 0.9 | 0.9 | 0.9 | 0.9 | 0.9 | 0.9 | 0.9 | 0.9 | 0.9 |
| Organic solvent | | | | | | | | | |
| MEK | 98.4 | 10.2 | 98.4 | 70.3 | — | — | 98.4 | 98.4 | 98.4 |
| MIBK | — | — | — | 70.3 | — | — | — | — | — |
| PGMEA | — | 57.6 | — | — | — | — | — | — | — |
| Isopropanol | — | — | — | — | 237.0 | 237.0 | — | — | — |
| Total | 200.2 | 169.6 | 200.2 | 242.4 | 338.8 | 338.8 | 200.2 | 200.2 | 200.2 |
| Non-volatile component (%) | 51 | 60 | 51 | 42 | 30 | 30 | 51 | 51 | 51 |
| Cured product properties | | | | | | | | | |
| Pencil hardness | 8H | 8H | 8H | 8H | 8H | 8H | 8H | 8H | 7H |
| Adhesion to substrate (%) | 100 | 100 | 100 | 100 | 100 | 100 | 100 | 100 | 100 |
| SW scratch resistance | Good | Good | Good | Good | Good | Good | Good | Good | Bad |
| Shear lubricity force (N) | 7.0 | 8.1 | 8.1 | 7.0 | 7.6 | 8.1 | 16.2 | 35.1 | 8.1 |
| External appearance | Good | Good | Good | Good | Good | Good | Good | Good | Good |

In Table 2, the amount of the reactive particles (A) and oxide particles (A1) indicate the weight of the particles (excluding organic solvents) included in each dispersion sol. The meanings for the symbols in Table 2 are as follows.

A-1: Dispersion liquid of reactive particles (A) prepared in Preparation Example 1

A-2: Dispersion liquid of reactive particles (A) prepared in Preparation Example 2

A-3: Dispersion liquid of reactive particles (A) prepared in Preparation Example 3

A1-1: Methyl ethyl ketone silica sol (silica concentration: 30%)

C-1: Terminal reactive polydimethylsiloxane compound (C) manufactured in Synthesis example 2.

Example 2

C-2: Terminal reactive polydimethylsiloxane compound (C) manufactured in Synthesis example 3.

Example 3

C-3: Terminal reactive polydimethylsiloxane compound (B) manufactured in Synthesis example 4

Example 4

B-1: Dipentaerythritol hexaacrylate
B-2: Pentaerythritol triacrylate
F-1: 1-Hydroxycyclohexyl phenyl ketone
F-2: 2-Methyl-1-[4-(methylthio)phenyl]-2-morpholinopropanone-1
MEK: Methyl ethyl ketone
MIBK: Methyl isobutyl ketone
PGMEA: Propylene glycol monomethyl ether acetate

Example 8–11

Examples 8–11 illustrate preparation examples of a different embodiment of compositions of the present invention and Comparative experiments 1–6 illustrate comparative preparation examples.

Example 8

144.7 parts of the dispersion liquid of Dispersion Liquid "A-4" prepared in Preparation Example 4 (reaction product: 51.7 parts, dispersion medium: methyl ethyle ketone (MEK)), 48.3 parts of dipentaerythritol hexaacrylate, 3.0 parts of 1-hydroxycyclohexyl phenyl ketone, and 1.8 parts of 2-methyl-1-(4-(methylthio)phenyl)-2-morpholinopropanone-1 were stirred for 2 hours in a dry air stream in a container shielded from ultraviolet rays to obtain a homogeneous composition solution. After the addition of 0.3 part of pentaerythritoltetrakis[3-(3,5-di-t-butyl-4-hydroxyphenyl)propionate] ("Irganox 1010" manufactured by Ciba Specialty Chemicals Co., Ltd.) and 0.3 part of bis(1,2,2,6,6-pentamethyl-4-piperidyl)sebacate ("Sanol LS-765" manufactured by Sankyo Co., Ltd.), the mixture was stirred for 2 hours to obtain a homogeneous composition solution.

The solid content of the composition measured in the same manner as in Preparation Example 1 was 53%.

Example 9

273.4 parts of the dispersion liquid "A-3" prepared in Preparation Example 3 (reaction product: 51.7 parts, dispersion medium: isopropanol (IPA)), 48.3 parts of trimethylolpropane triacrylate, 3.0 parts of 1-hydroxycyclohexyl phenyl ketone, and 1.8 parts of 2-methyl-i-(4-(methylthio)phenyl)-2-morpholinopropanone-1 were stirred for 2 hours in a dry air stream in a container shielded from ultraviolet rays to obtain a homogeneous composition solution. After the addition of 0.3 part of pentaerythritoltetrakis[3-(3,5-di-t-butyl-4-hydroxyphenyl)propionate ("Irganox 1010" manufactured by Ciba Specialty Chemicals Co., Ltd.) and 0.3 part of bis(1,2,2,6,6-pentamethyl-4-piperidyl)sebacate ("Sanol LS-765" manufactured by Sankyo Co., Ltd.), the mixture was stirred for 2 hours to obtain a homogeneous composition solution. The solid content of the composition measured in the same manner as in Preparation Example 1 was 32%.

Examples 10–11 and Comparative Experiments 3–6

Compositions of Examples 10–11 and Comparative experiments 3–6 were prepared in the same manner as in Examples 8 and 9 except for using the components shown in Table 3.

1. Evaluation of Cured Film for Examples 8–11 and Comparative Experiments 3–6

To demonstrate the effects of the composition of the present invention, cured films obtained by drying and irradiating the compositions applied to a substrate were evaluated. The evaluation methods are described below. The evaluation results are shown in Table 3.

2. Applying, Drying, and Curing Conditions

The compositions were applied to a substrate using a bar coater so that the thickness after drying was 12 μm. The compositions were dried in a hot blast oven at 80° C. for 3 minutes, irradiated at a dose of 1 J/cm$^2$ using a conveyer-type mercury lamp, and allowed to stand at 25° C. for 24 hours before evaluation.

3. Substrate

A glass plate was used in a pencil hardness test. A polyethylene terephthalate (PET) film with a thickness of 188 μm was used for evaluation of steel-wool scratch resistance, yellow index, and adhesion.

4. Evaluation Methods

Pencil Hardness

Films cured on a glass substrate were evaluated according to JIS K5400.

Steel Wool (SW) Scratch Resistance

0000 steel wool was reciprocated 30 times using a Gakushin-type abrasion resistance tester (manufactured by Tester Industry Co., Ltd.) with a load of 500 g to evaluate the scratch conditions of the surfaces of the films by naked eye observation. The case where no scratch was observed was evaluated as "Excellent", the case where 1–10 scratches were observed was evaluated as "Fair", and the case where more than 10 scratches were observed was evaluated as "Bad".

Yellow Index (ΔYI)

The yellow index was measured using a micro spectrocolorimeter ("SZ-Σ80" manufactured by Nippon Denshoku Industries Co., Ltd.). Reflection was measured with a C/2 light source to calculate the difference in the yellow index (ΔYI) using the substrate PET film as a standard.

Adhesion

According to a cellophane tape cross-cut peeling test prescribed in JIS K5400, adhesion was evaluated by the percentage of the number of 1 mm×1 mm squares remaining among 100 squares.

QUV Light Resistance Test

A QUV light resistance test was carried out using a QUV Accelerated Weathering Tester (manufactured by THE Q-PANEL COMPANY) and UVA351 as a lamp. Test specimens were irradiated at 40° C. and evaluated after 200 hours.

TABLE 3

|  | Example | | | | Comparative experiment | | | |
| --- | --- | --- | --- | --- | --- | --- | --- | --- |
|  | 8 | 9 | 10 | 11 | 3 | 4 | 5 | 6 |
| Reaction product (X) including reactive particles (A) | | | | | | | | |
| Solid content in dispersion liquid "A-4" | 51.7 |  | 51.7 | 51.7 | 51.7 |  | 51.7 | 51.7 |
| Solid content in dispersion liquid "A-3" |  | 51.7 |  |  |  | 51.7 |  |  |
| Dispersion medium | | | | | | | | |
| MEK as major component | 93.0 |  | 93.0 | 93.0 | 93.0 |  | 93.0 | 93.0 |
| IPA as major component |  | 221.7 |  |  |  | 221.7 |  |  |
| Compound (B) | | | | | | | | |
| B-1 | 48.3 |  | 48.3 | 48.3 | 48.3 |  | 48.3 | 48.3 |
| B-3 |  | 48.3 |  |  |  | 48.3 |  |  |
| Antioxidant (D) | | | | | | | | |
| D-1 | 0.3 | 0.3 | 0.15 |  |  |  | 0.6 |  |
| D-2 |  |  |  | 0.3 |  |  |  |  |

TABLE 3-continued

|  | Example | | | | Comparative experiment | | | |
| --- | --- | --- | --- | --- | --- | --- | --- | --- |
|  | 8 | 9 | 10 | 11 | 3 | 4 | 5 | 6 |
| Light stabilizer (E) | | | | | | | | |
| E-1 | 0.3 | 0.3 | 0.15 | 0.3 | | | | 0.6 |
| Polymerization initiator (F) | | | | | | | | |
| F-1 | 3.0 | 3.0 | 3.0 | 3.0 | 3.0 | 3.0 | 3.0 | 3.0 |
| F-2 | 1.8 | 1.8 | 1.8 | 1.8 | 1.8 | 1.8 | 1.8 | 1.8 |
| Total | 198.4 | 327.1 | 198.1 | 189.8 | 197.8 | 326.5 | 198.4 | 198.4 |
| Solid content (%) | 53 | 32 | 53 | 53 | 53 | 32 | 53 | 53 |
| Pencil hardness | 8H | 8H | 8H | 8H | 8H | 8H | 8H | 8H |
| SW scratch resistance | Excellent | Excellent | Excellent | Excellent | Excellent | Excellent | Excellent | Excellent |
| Adhesion (%) | | | | | | | | |
| Initial value | 100 | 100 | 100 | 100 | 100 | 100 | 100 | 100 |
| QUV 200 hours | 100 | 100 | 100 | 100 | 48 | 32 | 81 | 72 |
| ΔYI | | | | | | | | |
| Initial value | 1.82 | 1.90 | 1.79 | 1.83 | 1.79 | 1.88 | 1.86 | 1.84 |
| QUV 200 hours | 2.41 | 2.80 | 2.61 | 2.48 | 3.26 | 3.30 | 3.01 | 3.06 |

B-1: Dipentaerythritol hexaacrylate

B-3: Trimethylolpropane triacrylate

D-1: Pentaerythritoltetrakis[3-(3,5-di-t-butyl-4-hydroxyphenyl)propionate] ("Irganox 1010" manufactured by Ciba Specialty Chemicals Co., Ltd.)

D-2: Octadecyl-3-(3,5-di-t-butyl-4-hydroxyphenyl)propionate) ("Irganox 1076" manufactured by Ciba Specialty Chemicals Co., Ltd.)

E-1: Bis(1,2,2,6,6-pentamethyl-4-piperidyl)sebacate ("Sanol LS-765" manufactured by Sankyo Co., Ltd.)

Evaluation of Composite Product (Lens of Glasses) With Cured Films Laminated Thereon Preparation of lens of glasses with cured films laminated thereon Example 12 and Comparative experiment 7 show examples in which the cured films were laminated on a lens of glasses made of an acrylic resin with a diameter of 72 mm.

Example 12

A lens of glasses made of an acrylic resin with a diameter of 72 mm was immersed in a solution in which 189.8 parts of the composition obtained in Example 1 was diluted with 100 parts of n-butanol. The lens was dip-coated by removing the lens from the solution at a rate of 200 mm/minute. After drying in a hot blast oven at 80° C. for 3 minutes, both sides of the lens was irradiated at a dose of 0.7 J/cm$^2$ using a conveyer-type mercury lamp to prepare a lens of glasses with the cured films laminated thereon. The thicknesses of the cured films after drying were 5 μm.

Comparative Experiment 7

A lens of glasses was prepared in the same manner as in Example 5 except for using a solution in which 189.2 parts of the composition obtained in Comparative experiment 1 was diluted with 100 parts of n-butanol. The thicknesses of the cured films after drying were 5 μm.

2. Evaluation Method Example 12 and Comp Exp 7.

Methods of evaluating the composite products (lenses of glasses) obtained in Example 12 and Comparative experiment 7 are described below. The evaluation results are shown in Table 4.

Steel Wool (SW) Scratch Resistance

0000 steel wool was reciprocated 10 times on the lenses of glasses with the cured films laminated thereon with a load of 500 g to evaluate the scratches of the surface of the films by naked eye observation. The case where no scratch was observed was evaluated as "Excellent", the case where 1–10 scratches were observed was evaluated as "Fair", the case where more than 10 scratches were observed was evaluated as "Bad", and the case where the film was removed was evaluated as "Worse".

Yellow Index (ΔYI)

The yellow index was measured using a micro spectrocolorimeter ("SZ-Σ80" manufactured by Nippon Denshoku Industries Co., Ltd.). Reflection was measured with a C/2 light source to calculate the difference in the yellow index (ΔYI) using the substrate lens made of an acrylic resin as a standard.

QUV Light Resistance Test

A QUV light resistance test was carried out using a QUV Accelerated Weathering Tester (manufactured by THE Q-PANEL COMPANY) and UVA351 as a lamp. Test specimens were irradiated at 40° C. and evaluated after 200 hours.

TABLE 4

|  | Example 8 | Comparative experiment 7 |
| --- | --- | --- |
| SW scratch resistance | | |
| Initial value | Excellent | Excellent |
| QUV 200 hours | Excellent | Worse |
| ΔYI | | |
| Initial value | 1.10 | 1.07 |
| QUV 200 hours | 0.75 | 0.92 |

As described above, the present invention can provide a curable resin composition capable of forming a coating (cured film) excelling in hardness, scratch resistance, adhesion, and light resistance on the surface of various substrates, a cured film, and a composite product.

Examples of Cured Products Having Low Surface Resistivity

Preparation Example 5

260 parts of a methyl ethyl ketone dispersion product of antimony-doped tin oxide particles comprising silicon oxide on the surface thereof ("SNS-10M", manufactured by Ishihara Sangyo Kaisha, Ltd., antimony-doped tin oxide content: 27.4%, weight average particle diameter determined by dynamic light scattering method: 40 nm, number average particle diameter: 22 nm), 25 parts of the alkoxysilane 1 obtained in the synthesis example 1, 0.3 part of distilled water, and 0.03 part of p-hydroquinone monomethyl ether were mixed and heated at 65° C. while stirring. After 5 hours, 8.0 parts of methyl orthoformate was added. The mixture was heated for a further one hour to obtain a reaction solution with a solid content of 35.1% (reaction solution A-5). The reaction solution A-5 contained 24.3% of antimony-doped tin oxide, 8.5% of a reaction product of the alkoxysilane 1, and 62.0% of methyl ethyl ketone.

Example 12 Formation of Antistatic Antireflection Laminated Body

The reaction solution A-5 prepared in the synthesis Example 5 containing also 1 wt % of Irgacure 907 was diluted with a solution of MIBK and tert-butanol (weight ratio: 6 to 4). The mixture was then filtered through a filter with a pore diameter of 1 μm to prepare a solution with a solid content concentration of 3 wt % (solution A-5).

The solution A-5 was applied to an acrylic plate with a thickness of 3 mm using a dip coater at a removal rate of 250 mm/minute. The applied solution was then irradiated with ultraviolet rays at a dose of 0.5 J/cm$^2$ in a nitrogen atmosphere to obtain a cured film. The thickness of the resulting cured film measured using an ellipsometer was 120 nm. The surface resistivity of the cured film was $3 \times 10^9$ Ω. The cured film exhibited superior transparency and good adhesion.

Example 13 Formation of Layer With Low Refractive Index

An autoclave was charged with 21.3 parts of perfluoropropyl vinyl ether, 20.1 parts of ethyl vinyl ether, 10.6 parts of hydroxyethyl vinyl ether, 0.5 part of lauroyl peroxide, and 200 parts of ethyl acetate. After the addition of 48 parts of hexafluoropropylene under pressure in a nitrogen atmosphere, the mixture was reacted at 70° C. for 20 hours. After cooling, the solution was added to a large quantity of methanol to obtain 88 g (dry weight) of a fluorine polymer. This polymer had a glass transition temperature (Tg) of 28° C., fluorine content of 52%, and refractive index of 1.38. The resulting polymer was dissolved in a solution of MIBK and tert-butanol (weight ratio: 6 to 4) to prepare a liquid with a concentration of 3% (low refraction liquid D-1).

Formation of Antistatic Antireflection Plate

The low refraction liquid D-4 was applied to the acrylic plate with the cured film of the solution A-4 formed thereon using a dip coater at a removal rate of 250 mm/minute, and dried at 50° C. for 30 minutes to form a fluorine polymer film with a low refractive index (thickness: 110 mm). The reflectance of this antireflection plate measured using a spectrophotometer with a 60 mm(integrating sphere ("U3410", manufactured by Hitachi Ltd.) was 1.2%. The surface resistivity of the antireflection plate was $5 \times 10^{10}$ Ω. The antireflection plate exhibited superior transparency.

Example 14 Formulation for an Antistatic Coating Containing Silica Particles

A coating formulation having antistatic properties has been prepared by combining 59.8 parts of MT-ST (30% silica in methanol), 5.7 parts of component A2 from synthesis example 1, 6.0 parts trimethylorthoformate, 23.6 parts SR399, 0.7 parts Irgacure 184, 0.7 parts Irgacure 907 and 3.4 parts N-trimethoxysilylpropyl-N,N,N-trimethylammonium chloride (antistatic agent).

The formulation had a volume resistivity of $1.1 \ast 10^7$ Ω.cm.

The invention claimed is:
1. A curable resin composition comprising
    (A) reactive particles prepared by bonding (A1) at least one of oxide particles of an element selected from the group consisting of silicon, aluminum, zirconium, titanium, zinc, germanium, indium, tin, antimony, ruthenium, rhenium, silver, nickel, copper and cerium, and
    (A2) an organic compound which comprises a polymerizable unsaturated group,
    (B) a compound having two or more polymerizable unsaturated groups in the molecule,
    (C) a terminal reactive polydimethylsiloxane compound having at least one polymerizable unsaturated group and a urethane bond in the molecule, other than organic compound (A2).
2. The curable resin composition according to claim 1, wherein the number average particle diameter of the oxide particles (A1) is preferably 0.001–2 μm.
3. The curable resin composition according to claim 1, wherein the oxide particles are conductive particles having a volume resistivity of 300 Ω·cm or less.
4. The curable resin composition according to claim 1, wherein the composition contains oxide particles used as the conductive particles, that are chosen from the group consisting of tin-doped indium oxide (ITO), antimony-doped tin oxide (ATO), fluorine-doped tin oxide (FTO), phosphorus-doped tin oxide (PTO), zinc antimonate, indium-doped zinc oxide, ruthenium oxide, rhenium oxide, silver oxide, nickel oxide, and copper.
5. The curable resin composition according to claim 1, wherein the organic compound (A2) comprises a polymerizable unsaturated group in the molecule, and the group [—X—C(=Y)—NH—] shown by the formula

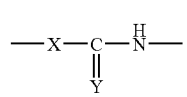

wherein X represents NH, O (oxygen atom), or S (sulfur atom), and Y represents O or S.
6. The curable resin composition according to claim 1, wherein the organic compound (A2) contains a silanol group or a compound which forms a silanol group by hydrolysis.

7. The curable resin composition according to claim 1, wherein the compound (C) contains an acryloxy group and methacryloxy group.

8. The curable resin composition according to claim 1, wherein the polystyrene-reduced number average molecular weight of the compound (C) determined by the GPC method is preferably from 800 to 15000.

9. The curable resin composition according to claim 8, wherein the compound (C) has the formula

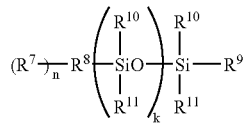

(ii)

wherein $R^7$ is an organic group having a functional group selected from the group consisting of an acryloxy group, methacryloxy group, vinylether group and epoxy group, $R^8$ is an organic group having a valence of (n+1), $R^9$ is an alkyl group having 1 to 12 carbon atoms, $R^{10}$ and $R^{11}$ are individually a methyl group or phenyl group, n is a numeral from 0 to 3, and k is a numeral from 1 to 150.

10. The curable resin composition according to claim 1, wherein the amount of compound (C) is 0.01–5 wt % relative to the total weight of reactive particles (A), compound (B), and compound (C).

11. The curable resin composition according to anyone of claims 1, wherein, the composition further comprises a phenol-type antioxidant (D) and hindered amine-type light stabilizer (E).

12. The curable resin composition according to claim 11, wherein the total amount of the antioxidant (D) and the light stabilizer (E) to be added is 0.01–10 by weight for 100 parts by weight of the total solid content of the reaction product (A) and the compounds (B) and (C).

13. A curable resin composition comprising
   (A) reactive particles prepared by bonding (A1) at least one of oxide particles of an element selected from the group consisting of silicon, aluminum, zirconium, titanium, zinc, germanium, indium, tin, antimony, ruthenium, rhenium, silver, nickel, cupper and cerium, (A2) an organic compound which comprises a polymerizable unsaturated group and (A3) an organic compound that contains silicon and a radical polymerization initiation group in the same molecule;
   (B) a compound having two or more polymerizable unsaturated groups in the molecule,
   (C) a terminal reactive polysiloxane compound having at least one polymerizable group in the molecule.

14. A process comprising coating the curable resin composition as defined in claim 1 on a substrate.

15. An optical parts, DVD display panels, touch panels, magneto optical discs, plastic containers, windows or pane having a coating made from the curable resin composition as defined in claim 1.

16. A products comprising a substrate having a coating obtained by curing a resin composition according to claim 1, wherein the product has a shear lubricity force of less than 20 N when subjected to a shear lubricity test at a tensile rate of 50 mm/minute with a contact area of 5.4 cm² and pressure of 4.7 N/cm² applied from two double clips.

17. A product comprising a substrate having a coating obtained by curing a resin composition of claim 1, wherein the product has a surface resistivity of $10^{12}$ Ω or less.

18. A curable resin composition comprising
   (A) reactive particles prepared by bonding (A1) at least one of oxide particles of an element selected from the group consisting of silicon, aluminum, zirconium, titanium, zinc, germanium, indium, tin, antimony, ruthenium, rhenium, silver, nickel, cupper and cerium, comprising silicon oxide on the surface, and (A2) an organic compound which comprises a polymerizable unsaturated group,
   (B) a compound having two or more polymerizable unsaturated groups in the molecule, and
   (C) a terminal reactive polydimethylsiloxane compound having at least one polymerizable unsaturated group and a urethane bond in the molecule, other than organic compound (A2),
wherein the resin composition has a volume resistivity of $10^{12}$ Ω.cm or less.

19. The curable resin composition according to claim 18, wherein the volume resistivity is $10^8$ Ω.cm or less.

20. A curable resin composition comprising
   (A) reactive particles prepared by bonding (A1) at least one of oxide particles of an element selected from the group consisting of silicon, aluminum, zirconium, titanium, zinc, germanium, indium, tin, antimony, ruthenium, rhenium, silver, nickel, cupper and cerium comprising silicon oxide on the surface, and (A2) an organic compound which comprises a polymerizable unsaturated group,
   (B) a compound having two or more polymerizable unsaturated groups in the molecule, and
   (C) a terminal reactive polydimethylsiloxane compound having at least one polymerizable unsaturated group and a urethane bond in the molecule, other than organic compound (A2),
wherein the oxide particles are conductive particles that comprise silicon oxide on the surface.

21. A curable resin composition comprising
   (A) reactive particles prepared by bonding (A1) at least one of oxide particles of an element selected from the group consisting of silicon, aluminum, zirconium, titanium, zinc, germanium, indium, tin, antimony, ruthenium, rhenium, silver, nickel, cupper and cerium comprising silicon oxide on the surface, (A2) an organic compound which comprises a polymerizable unsaturated group, and (A3) an organic compound that contains silicon and a radical polymerization initiation group in the same molecule;
   (B) a compound having two or more polymerizable unsaturated groups in the molecule; and
   (C) a terminal reactive polydimethylsiloxane compound having at least one polymerizable unsaturated group and a urethane bond in the molecule, other than organic compound (A2).

22. A curable resin composition comprising
   (A) reactive particles prepared by bonding (A1) at least one of oxide particles of an element selected from the group consisting of silicon, aluminum, zirconium, titanium, zinc, germanium, indium, tin, antimony, ruthenium, rhenium, silver, nickel, cupper and cerium comprising silicon oxide on the surface, (A2) an organic compound which comprises a polymerizable unsaturated group, and (A3) an organic compound that contains silicon and a radical polymerization initiation group in the same molecule;
   (B) a compound having two or more polymerizable unsaturated groups in the molecule; and
   (C) a terminal reactive polysiloxane compound having at least one polymerizable group in the molecule,
wherein the oxide particles are conductive particles that comprise silicon oxide on the surface.

* * * * *